US012731590B2

(12) United States Patent
Moritz et al.

(10) Patent No.: US 12,731,590 B2
(45) Date of Patent: Sep. 8, 2026

(54) END-TO-END SPEECH RECOGNITION ADAPTED FOR MULTI-SPEAKER APPLICATIONS

(71) Applicant: Mitsubishi Electric Research Laboratories, Inc., Cambridge, MA (US)

(72) Inventors: Niko Moritz, Allston, MA (US); Jonathan Le Roux, Cambridge, MA (US); Takaaki Hori, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 654 days.

(21) Appl. No.: 18/049,712

(22) Filed: Oct. 26, 2022

(65) Prior Publication Data

US 2024/0153508 A1 May 9, 2024
US 2025/0104717 A9 Mar. 27, 2025

Related U.S. Application Data

(60) Provisional application No. 63/263,096, filed on Oct. 27, 2021.

(51) Int. Cl.
*G10L 17/06* (2013.01)
*G06F 40/169* (2020.01)
(Continued)

(52) U.S. Cl.
CPC ............ *G10L 17/06* (2013.01); *G06F 40/169* (2020.01); *G10L 15/16* (2013.01); *G10L 15/26* (2013.01)

(58) Field of Classification Search
CPC ......... G10L 17/06; G10L 15/16; G10L 15/26; G06F 40/169
See application file for complete search history.

(56) References Cited

U.S. PATENT DOCUMENTS 10,229,672 B1 * 3/2019 Rao .......................... G10L 15/16
2018/0174576 A1 * 6/2018 Soltau ..................... G10L 15/02
(Continued)

FOREIGN PATENT DOCUMENTS

CN 111145733 A * 5/2020 ......... G10L 15/1815
WO WO-2021144961 A1 * 7/2021 ......... G06F 16/9035

OTHER PUBLICATIONS

X. Chang, Y. Qian, K. Yu and S. Watanabe, "End-to-end Monaural Multi-speaker ASR System without Pretraining," ICASSP 2019—2019 IEEE International Conference on Acoustics, Speech and Signal Processing (ICASSP), Brighton, UK, 2019, pp. 6256-6260, doi: 10.1109/ICASSP.2019.8682822. (Year: 2019).*

(Continued)

*Primary Examiner* — Daniel C Washburn
(74) *Attorney, Agent, or Firm* — Gene Vinokur

(57) ABSTRACT

A system for performing end-to-end automatic speech recognition (ASR). The system configured to collect a sequence of acoustic frames associated with a mixture of speeches performed by multiple speakers. Each frame from the sequence of acoustic frames is encoded using a multi-head encoder which encodes each frame into a likelihood of a transcription output and a likelihood of an identity of a speaker. The multi-head encoder thus produces a sequence of likelihoods of transcription outputs and a sequence of likelihoods of identities of the speakers corresponding to the sequence of acoustic frames that are decoded using a decoder performing an alignment operation for producing a (Continued)

sequence of transcription outputs annotated with identities of the speakers, for performing speaker separation.

20 Claims, 24 Drawing Sheets

(51) Int. Cl.
*G10L 15/16* (2006.01)
*G10L 15/26* (2006.01)

(56) References Cited

U.S. PATENT DOCUMENTS

| | | | | |
|---|---|---|---|---|
| 2018/0341860 | A1* | 11/2018 | Shazeer | G06N 3/045 |
| 2020/0027444 | A1* | 1/2020 | Prabhavalkar | G06N 3/044 |
| 2020/0357388 | A1 | 11/2020 | Zhao et al. | |
| 2021/0312905 | A1 | 10/2021 | Zhao et al. | |
| 2022/0129749 | A1* | 4/2022 | Moritz | G06N 3/082 |
| 2022/0199094 | A1* | 6/2022 | El Shafey | G06N 3/08 |
| 2022/0254352 | A1* | 8/2022 | Fujita | G10L 17/18 |
| 2024/0347064 | A1* | 10/2024 | Li | G06N 3/063 |

OTHER PUBLICATIONS

Chang, Xuankai, Niko Moritz, Takaaki Hori, Shinji Watanabe, and Jonathan Le Roux. "Extended graph temporal classification for multi-speaker end-to-end ASR." In ICASSP 2022-2022 IEEE International Conference on Acoustics, Speech and Signal Processing (ICASSP), pp. 7322-7326. IEEE, 2022. (Year: 2022).*

Nakatani, Tomohiro. "Improving transformer-based end-to-end speech recognition with connectionist temporal classification and language model integration." In proc. INTERSPEECH, vol. 2019, pp. 1408-1412. 2019. (Year: 2019).*

Li, Qiujia, Chao Zhang, and Philip C. Woodland. "Combining frame-synchronous and label-synchronous systems for speech recognition." arXiv preprint arXiv:2107.00764 (2021). (Year: 2021).*

Salazar, Julian, Katrin Kirchhoff, and Zhiheng Huang. "Self-attention networks for connectionist temporal classification in speech recognition." In Icassp 2019-2019 IEEE international conference on acoustics, speech and signal processing (icassp), pp. 7115-7119. IEEE, 2019. (Year: 2019).*

H. Seki, S. Watanabe, T. Hori, J. Le Roux, and J. R. Hershey, "A purely end-to-end system for multi-speaker speech recognition," in Proc. ACL, Jul. 2018.

N. Kanda, Y. Gaur, X.Wang, Z. Meng, and T. Yoshioka, "Serialized output training for end-to-end overlapped speech recognition," arXiv preprint arXiv:2003.12687, 2020.

J. Shi, X. Chang, P. Guo, S. Watanabe, Y. Fujita, J. Xu, B. Xu, and L. Xie, "Sequence to multi-sequence learning via conditional chain mapping for mixture signals," in Proc. NeurIPS, 2020, pp. 3735-3747.

A. Tripathi, H. Lu, H. Sak, and H. Soltau, "Monotonic recurrent neural network transducer and decoding strategies," in Proc. ASRU, 2019, pp. 944-948.

A. Graves, "Sequence transduction with recurrent neural networks," arXiv preprint arXiv:1211.3711, 2012.

A. Hannun, V. Pratap, J. Kahn, and W.-N. Hsu, "Differentiable weighted finite-state transducers," arXiv preprint arXiv:2010.01003, 2020.

* cited by examiner

1: $\ell \leftarrow ((\langle sos \rangle, 0), )$
2: $p_b(\ell) \leftarrow 1, p_{nb}(\ell) \leftarrow 0$
3: $A_{\text{prev}} \leftarrow \{\ell\}$
4: for t=1,...,T do
5: $\quad A_{\text{next}} \leftarrow \{\}$
6: $\quad$ for $\ell$ in $A_{\text{prev}}$ do
7: $\quad\quad$ for $c$ in $\mathcal{U}$ do
8: $\quad\quad\quad$ if $c =$ blank then
9: $\quad\quad\quad\quad p_b(\ell) \leftarrow p(\text{blank}; x_t)p^{\omega}(\text{blank}; x_t)(p_b(\ell; x_{1:t-1}) + p_{nb}(\ell; x_{1:t-1}))$ (901)
10: $\quad\quad\quad\quad$ add $\ell$ to $A_{\text{next}}$
11: $\quad\quad\quad$ else
12: $\quad\quad\quad\quad$ for $s = 1, \ldots, S$ do ▷ Loop over speaker index (902)
13: $\quad\quad\quad\quad\quad \ell^{+} \leftarrow$ append $(c, s)$ to $\ell$
14: $\quad\quad\quad\quad\quad$ if $(c, s) = \ell_{\text{end}}$ then
15: $\quad\quad\quad\quad\quad\quad p_{nb}(\ell^{+}; x_{1:t}) \leftarrow p(c; x_t)p_b(\ell; x_{1:t-1})p^{\omega}(s; x_t)$
16: $\quad\quad\quad\quad\quad\quad p_{nb}(\ell; x_{1:t}) \leftarrow p(c; x_t)p_{nb}(\ell; x_{1:t-1})p^{\omega}(s; x_t)$
17: $\quad\quad\quad\quad\quad$ else
18: $\quad\quad\quad\quad\quad\quad p_{nb}(\ell^{+}; x_{1:t}) \leftarrow p(c; x_t)(p_b(\ell; x_{1:t-1}) + p_{nb}(\ell; x_{1:t-1}))p^{\omega}(s; x_t)$
19: $\quad\quad\quad\quad\quad$ end if

Word Error Rates [%]

| Model | 0% overlap | | 20% overlap | | 40% overlap | | Full overlap | |
|---|---|---|---|---|---|---|---|---|
| | dev | test | dev | test | dev | test | dev | test |
| Single-Speaker CTC | 34.6 | 34.1 | 37.4 | 37.0 | 45.9 | 45.3 | 76.3 | 75.9 |
| PIT-CTC | 18.8 | 19.2 | 19.9 | 22.3 | 22.9 | 23.5 | 32.9 | 33.8 |
| GTC-e | 20.5 | 21.1 | 22.6 | 23.3 | 26.3 | 27.3 | 44.6 | 45.8 |

Table 1

Oracle Token Error Rates [%]

| Model | 0% overlap | | 20% overlap | | 40% overlap | | Full overlap | | Average | |
|---|---|---|---|---|---|---|---|---|---|---|
| | dev | test | dev | test | dev | test | dev | test | dev | test 1101 |
| PIT-CTC 1002 | 18.5 | 18.4 | 19.4 | 19.5 | 22.0 | 22.4 | 30.1 | 30.9 | 22.5 | 22.8 |
| GTC-e 1003 | 19.5 | 20.1 | 21.1 | 21.4 | 24.1 | 24.6 | 33.4 | 33.9 | 24.6 | 25.0 1102 |

Table 2

FIG. 11

Beam Search results for Word Error Rates [%]

| Model 1002 | 0% overlap | | 20% overlap | | 40% overlap | | Full overlap | |
|---|---|---|---|---|---|---|---|---|
| | dev | test | dev | test | dev | test | dev | test |
| PIT-CTC 1003 | 11.7 | 12.4 | 12.6 | 13.4 | 16.3 | 18.1 | 24.0 | 26.3 |
| GTC-e | 14.8 | 15.5 | 16.5 | 17.2 | 19.5 | 20.4 | 32.7 | 33.7 |

Table 3

FIG. 12

Beam Search Results for Word Error Rates [%] for multiple speakers

| Model | 0% overlap | | 20% overlap | | 40% overlap | | Full overlap | |
|---|---|---|---|---|---|---|---|---|
| | dev | test | dev | test | dev | test | dev | test |
| GTC-e 2-speaker (1301) | 14.8 | 15.5 | 16.5 | 17.2 | 19.5 | 20.4 | 32.7 | 33.7 |
| - spk1 (1302) | 15.0 | 15.1 | 17.0 | 17.3 | 20.6 | 21.1 | 33.0 | 33.7 |
| - spk2 (1303) | 14.7 | 15.7 | 15.9 | 17.1 | 18.4 | 19.7 | 32.3 | 33.7 |

Table 4

FIG. 13

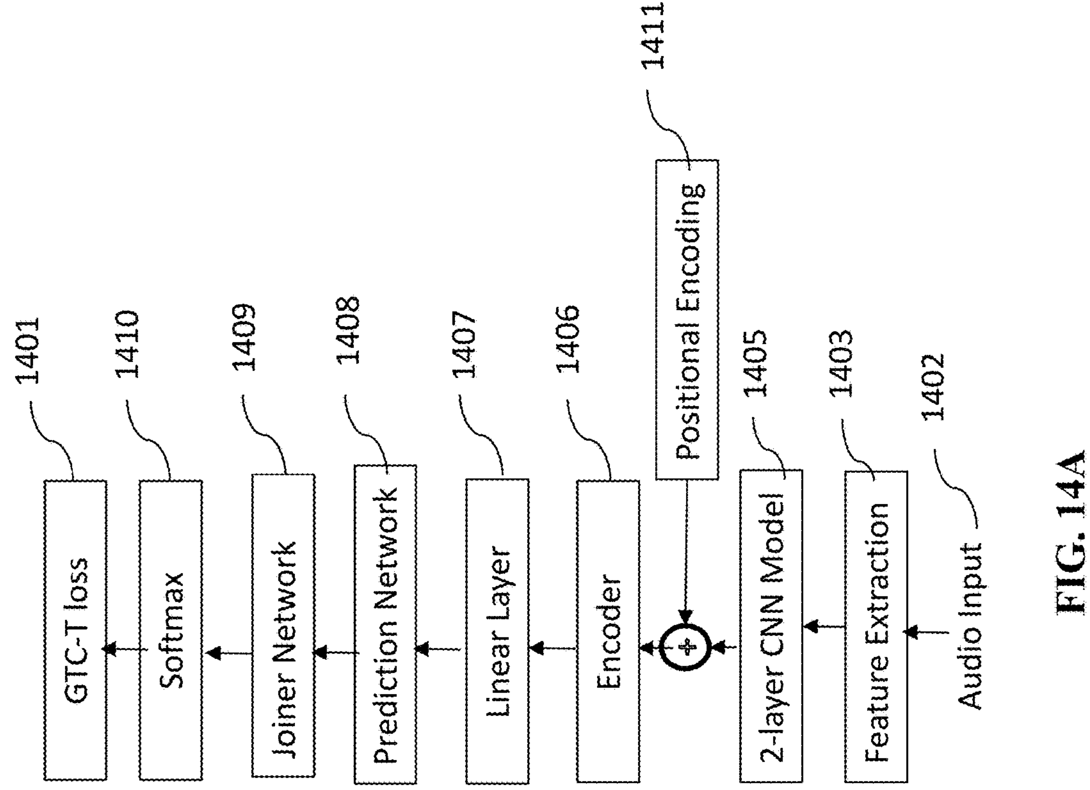
FIG. 14A

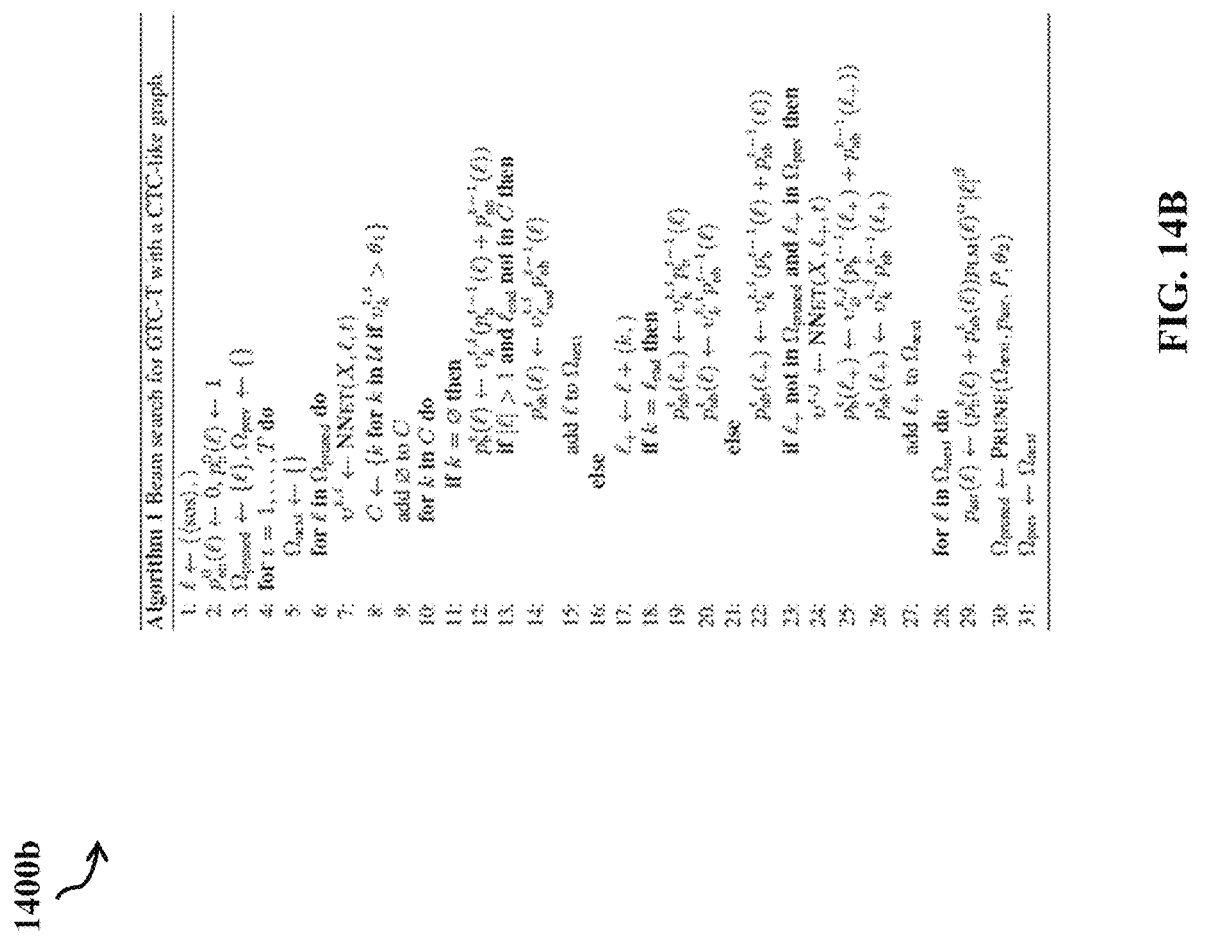

1400b

Algorithm 1 Beam search for GTC-T with a CTC-like graph $\ell \leftarrow (\langle \text{sos} \rangle, )$
$p_{\text{nb}}^{0}(\ell) \leftarrow 0,\ p_{\text{b}}^{0}(\ell) \leftarrow 1$
$\Omega_{\text{pruned}} \leftarrow \{\ell\},\ \Omega_{\text{prev}} \leftarrow \{\}$
for $t = 1, \ldots, T$ do
$\Omega_{\text{next}} \leftarrow \{\}$
for $\ell$ in $\Omega_{\text{pruned}}$ do
$v^{\ell,t} \leftarrow \text{NNET}(X, \ell, t)$
$C \leftarrow \{k$ for $k$ in $\mathcal{U}$ if $v_k^{\ell,t} > \theta_1\}$
add $\varnothing$ to $C$
for $k$ in $C$ do
if $k = \varnothing$ then
$p_{\text{b}}^{t}(\ell) \leftarrow v_{k}^{\ell,t}(p_{\text{b}}^{t-1}(\ell) + p_{\text{nb}}^{t-1}(\ell))$
if $|\ell| > 1$ and $\ell_{\text{end}}$ not in $C$ then
$p_{\text{nb}}^{t}(\ell) \leftarrow v_{\ell_{\text{end}}}^{\ell,t} p_{\text{nb}}^{t-1}(\ell)$
add $\ell$ to $\Omega_{\text{next}}$
else
$\ell_{+} \leftarrow \ell + (k, )$
if $k = \ell_{\text{end}}$ then
$p_{\text{nb}}^{t}(\ell_{+}) \leftarrow v_{k}^{\ell,t} p_{\text{b}}^{t-1}(\ell)$
$p_{\text{nb}}^{t}(\ell) \leftarrow v_{k}^{\ell,t} p_{\text{nb}}^{t-1}(\ell)$
else
$p_{\text{nb}}^{t}(\ell_{+}) \leftarrow v_{k}^{\ell,t}(p_{\text{b}}^{t-1}(\ell) + p_{\text{nb}}^{t-1}(\ell))$
if $\ell_{+}$ not in $\Omega_{\text{pruned}}$ and $\ell_{+}$ in $\Omega_{\text{prev}}$ then
$v^{\ell,t} \leftarrow \text{NNET}(X, \ell_{+}, t)$
$p_{\text{b}}^{t}(\ell_{+}) \leftarrow v_{\varnothing}^{\ell,t}(p_{\text{b}}^{t-1}(\ell_{+}) + p_{\text{nb}}^{t-1}(\ell_{+}))$
$p_{\text{nb}}^{t}(\ell_{+}) \leftarrow v_{k}^{\ell,t} p_{\text{nb}}^{t-1}(\ell_{+})$
add $\ell_{+}$ to $\Omega_{\text{next}}$
for $\ell$ in $\Omega_{\text{next}}$ do
$p_{\text{tot}}(\ell) \leftarrow (p_{\text{b}}^{t}(\ell) + p_{\text{nb}}^{t}(\ell)) p_{\text{LM}}(\ell)^{\alpha} |\ell|^{\beta}$
$\Omega_{\text{pruned}} \leftarrow \text{PRUNE}(\Omega_{\text{next}}, p_{\text{tot}}, P, \theta_2)$
$\Omega_{\text{prev}} \leftarrow \Omega_{\text{next}}$

FIG. 14B

| Loss | Training Graph | Init | Decoding Search | Decoding LM | WER [%] train-dev | WER [%] dev |
|---|---|---|---|---|---|---|
| CTC | - | - | greedy | - | 21.3 | 21.6 |
| CTC | - | - | BS10 | LSTM | 20.3 | 20.9 |
| RNN-T | - | - | BS10 | - | 22.7 | 23.1 |
| RNN-T | - | joint | BS10 | - | 21.5 | 22.2 |
| RNN-T | - | joint | BS10 | LSTM | 21.3 | 22.2 |
| GTC-T | CTC-like | - | greedy | - | 24.2 | 24.4 |
| GTC-T | CTC-like | CTC15 | greedy | - | 21.4 | 22.1 |
| GTC-T | MonoRNN-T | CTC15 | greedy | - | 21.9 | 22.7 |
| GTC-T | CTC-like | CTC15 | BS10 | - | 20.9 | 21.8 |
| GTC-T | CTC-like | CTC15 | BS10 | LSTM | 20.8 | 21.7 |

1400d

| Loss | Training Graph | Init | Decoding Search | Decoding LM | dev clean | dev other | test clean | test other |
|---|---|---|---|---|---|---|---|---|
| CTC | - | - | greedy | - | 4.9 | 12.0 | 5.0 | 11.7 |
| CTC | - | - | BS10 | LSTM | 2.8 | 7.2 | 2.9 | 7.3 |
| CTC | - | - | BS30 | LSTM | 2.7 | 7.1 | 2.9 | 7.1 |
| CTC | - | - | BS10 | Tr. | 2.6 | 6.9 | 2.8 | 6.9 |
| CTC | - | - | BS30 | Tr. | 2.5 | 6.8 | 2.5 | 6.8 |
| RNN-T | - | - | greedy | - | 3.2 | 8.0 | 3.3 | 8.2 |
| RNN-T | - | - | BS10 | - | 3.0 | 7.8 | 3.1 | 8.0 |
| RNN-T | - | joint | BS10 | - | 2.9 | 7.8 | 3.1 | 7.8 |
| RNN-T | - | joint | BS10 | LSTM | 2.4 | 6.6 | 2.7 | 6.7 |
| RNN-T | - | joint | BS30 | LSTM | 2.4 | 6.3 | 2.6 | 6.4 |
| RNN-T | - | joint | BS10 | Tr. | 2.4 | 6.8 | 2.7 | 6.5 |
| RNN-T | - | joint | BS30 | Tr. | 2.3 | 6.2 | 2.5 | 6.2 |
| GTC-T | MonoRNN-T | - | greedy | - | 5.3 | 13.2 | 5.4 | 13.5 |
| GTC-T | MonoRNN-T | CTC20 | greedy | - | 4.1 | 10.3 | 4.2 | 10.5 |
| GTC-T | CTC-like | - | greedy | - | 4.3 | 11.0 | 4.5 | 11.2 |
| GTC-T | CTC-like | - | BS10 | - | 4.2 | 10.4 | 4.3 | 10.6 |
| GTC-T | CTC-like | CTC20 | BS10 | - | 3.4 | 8.8 | 3.6 | 9.0 |
| GTC-T | CTC-like | CTC | BS10 | - | 3.2 | 8.4 | 3.4 | 8.5 |
| GTC-T | CTC-like | CTC | BS10 | LSTM | 2.4 | 6.1 | 2.7 | 6.2 |
| GTC-T | CTC-like | CTC | BS30 | LSTM | 2.4 | 6.0 | 2.6 | 6.2 |
| GTC-T | CTC-like | CTC | BS10 | Tr. | 2.3 | 6.0 | 2.5 | 6.0 |
| GTC-T | CTC-like | CTC | BS30 | Tr. | 2.3 | 5.8 | 2.5 | 5.9 |

FIG. 14D

END-TO-END SPEECH RECOGNITION ADAPTED FOR MULTI-SPEAKER APPLICATIONS

TECHNICAL FIELD

This disclosure generally relates to an artificial intelligence (AI) system for speech recognition, and more specifically to a method and system for end-to-end speech recognition adapted for multi-speaker applications.

BACKGROUND

Neural networks can reproduce and model nonlinear processes due to which, over the last decades, neural networks have been used in numerous applications of various disciplines. Neural networks can be learned (or are trained) by processing examples, each of which contains a known "input" and "result," forming probability-weighted associations between the two, which are stored within the data structure of the net itself. The training of a neural network from a given example is usually conducted by determining the difference between the processed output of the network (often a prediction) and a target output also referred to herein as a training label. This difference represents the error that the training aims to reduce. Hence, the network then adjusts its weighted associations according to a learning rule and using this error value. Successive adjustments will cause the neural network to produce an output that is increasingly similar to the target output. After a sufficient number of these adjustments, the training can be terminated based upon certain criteria.

This type of training is usually referred to as supervised learning. During supervised learning, the neural networks "learn" to perform tasks by considering examples, generally without being programmed with task-specific rules. For example, in image recognition, they might learn to identify images that contain cats by analyzing example images that have been labeled as "cat" or "no cat" and using the results to identify cats in other images. They do this without any prior knowledge of cats, for example, that they have fur, tails, whiskers, and cat-like faces. Instead, they automatically generate identifying characteristics from the examples that they process.

However, to perform such supervised learning, the images need to be labeled as cats or dogs. Such labeling is a tedious and laborious process. Also, in this image recognition example, the labeling is unambiguous. The images contain either cat, dog, or not cats or dogs. Such unambiguous labeling is not always possible. For example, some training applications tackle sequence problems where the timing is a variable. The time variable may create one-to-many or many-to-one ambiguity in such training where a sequence of inputs has a different length than a sequence of outputs.

Specifically, some methods of training neural networks use a connectionist temporal classification (CTC) objective function algorithm. The CTC is a loss function that is used to train the neural network when there is no temporal alignment information available between a sequence of training labels and a longer sequence of label probabilities outputted by the neural networks, which is computed from a sequence of observations inputted to the neural networks. Such missing temporal alignment information creates a temporal ambiguity between the sequence of label probabilities outputted by the neural networks and the supervision information for the training, which is the sequence of training labels that can be resolved using the CTC objective function.

However, the CTC objective function is suitable only to resolve the temporal ambiguity during the training of neural networks. The CTC objective function would fail if other types of ambiguities need to be considered.

A generalized form of CTC objective function is a graph based temporal classification (GTC) which is a type of loss function that uses graph representations in the loss function for training of deep neural networks. GTC loss function is used to handle sequence-to-sequence temporal alignment ambiguity resolution using deep neural networks. GTC can take graph-based supervisory information as an input to describe all possible alignments between an input sequence and an output sequence, for learning the best possible alignment from the training data.

One example of sequence based input to neural networks which require temporal and label ambiguity resolution is audio input. The audio input could be in the form of speech from one multiple speakers, which might need to be identified and separated for audio applications.

One example of such audio application is in automatic speech recognition (ASR) systems that are widely deployed for various interface applications such as voice search. However, it is challenging to make a speech recognition system that achieves a high recognition accuracy. This is because such a making requires deep linguistic knowledge of the target language that the ASR system accepts. For example, a set of phonemes, a vocabulary, and a pronunciation lexicon are indispensable for making such an ASR system. The phoneme set needs to be carefully defined by linguists of the language. The pronunciation lexicon needs to be created manually by assigning one or more phoneme sequences to each word in the vocabulary including over 100 thousand words. Moreover, some languages do not explicitly have a word boundary and therefore we may need tokenization to create the vocabulary from a text corpus. Consequently, it is quite difficult to develop speech recognition systems, especially for minor languages. The other problem is that a speech recognition system is factorized into several modules including acoustic, lexicon, and language models, which are optimized separately. This architecture may result in local optima, although each model is trained to match the other models.

End-to-end and sequence-to-sequence neural network models, respectively, have recently gained increased interest and popularity in the ASR community. The output of an end-to-end ASR system is usually a grapheme sequence that can either be single letters or larger units such as word pieces and entire words. The appeal of end-to-end ASR is that it enables a simplified system architecture compared to traditional ASR systems by being composed of neural network components and avoiding the need for linguistic expert knowledge to build ASR systems.

End-to-end ASR systems can learn all the components of a speech recognizer including the pronunciation, acoustic, and language model directly, which avoids the need for language-specific linguistic information and text normalization. These ASR systems perform a sequence-to-sequence transformation, in which the input is a sequence of acoustic features extracted from audio frames at a certain rate and the output is a sequence of characters. The sequence-to-sequence transformation allows considering various linguistic characteristics to improve the quality of recognition.

However, the improvement of the quality of the end-to-end ASR systems comes with the price of output delays caused by the need to accumulate a sequence of acoustic features and/or a sequence of acoustic frames for joint recognition. Hence, the end-to-end ASR systems are less applicable to online/streaming ASR, where low delays are required.

Various techniques like triggered attention or restricted self-attention have been developed for reducing output delays in end-to-end ASR systems. See, e.g., U.S. Pat. No. 11,100,920. However, these techniques are not applicable or at least are not directly applicable to multi-speaker recognition and/or multi-speaker streaming applications. This is because the multi-speaker application includes two independent tasks: speaker separation and speech recognition. Currently, the speaker separation of the multi-speaker ASR systems is either a pre-processing or a post-processing technique introducing additional delays that current methods for streaming end-to-end speech recognition cannot handle.

Accordingly, there is a need to reduce output delays in multi-speaker applications suitable for end-to-end and/or sequence-to-sequence speech recognition applications.

SUMMARY

It is an object of some embodiments to reduce output delays in multi-speaker applications configured for end-to-end and/or sequence-to-sequence speech recognition applications. One example of such application in a streaming speech recognition application. Some embodiments are based on understanding that to reduce the delay in the multi-speaker speech recognition applications, the speech separation and the speech recognition tasks should be considered jointly such that the speech recognition is performed concurrently with speech separation. Doing in such a manner may prevent incurring additional delays in speech recognition caused by pre-processing or post-processing techniques of speech separation.

Additionally or alternatively, some embodiments are based on the realization that if the speech separation is considered jointly with speech recognition, the speech separation can be replaced with speaker identification. In contrast with speech separation, which is considered an independent task, speaker identification can be treated as a task subordinate to speech recognition. Hence, speaker identification can be implemented as an internal process of speech recognition.

Keeping that in mind, some embodiments are based on understanding that speech recognition in end-to-end ASR systems is usually performed using an encoder and decoder. To make the speaker identification an internal process, some embodiments perform the speaker identification on the encoder level, while allowing the decoder to decode both the speech and the speaker. In such a manner, the speech separation is transformed into a part of the decoding that does not cause additional delays. However, to achieve this effect, the encoder needs to be a multi-head or multi-output encoder producing an encoding of a symbol and an identity of a speaker for each audio frame.

Some embodiments are based on the recognition that having the supervisory information from a directed graph of nodes connected by edges representing labels and transitions among the labels allows imposing flexible rules for training the neural networks. For example, some embodiments disclose training a neural network with a GTC objective function without inserting a blank label between all the training labels or with using multiple different blank labels. Additionally or alternatively, some embodiments disclose training a neural network with a GTC objective using a hidden Markov model (HMM) like topology for each of the labels, which can include multiple states. Additionally or alternatively, some embodiments disclose training a neural network with a GTC objective using a directed graph with transitions between nodes associated with a cost or a weighting factor.

In addition to using the supervisory information residing on the directed graph, some embodiments modified the GTC objective function to accommodate label alignment. For example, the GTC objective function is defined by maximizing the sum of the conditional probabilities of all node sequence paths with a particular start node and end node that can be generated from a given directed graph by unfolding the graph to the length of the sequence of label probabilities outputted by the neural network. The GTC training loss and the gradients can efficiently be computed by a dynamic programming algorithm that is based on computing forward and backward variables and stitching both together.

The GTC-based training of the neural network aims to update the trainable parameters of the neural network by optimizing the label predictions of the neural network such that the best overall predicted sequences of labels can be generated by the directed graph encoding the labeling information and minimizing the error of all possible label sequence predictions for a set of training sample and graph-based labeling information pairs. Examples of the trainable parameters include weights of neurons of the neural network, hyperparameters, and the like.

Additionally or alternatively, some embodiments are based on the realization that the GTC objective function and the directed graph allow considering not only multiple sequences of labels but also different probabilities for the multiple sequences of labels. Such a consideration is advantageous for the GTC objective function because this consideration can adapt the supervisory information for the specific situation. To that end, in some embodiments, the directed graph is weighted with different weights for at least some edges or transitions. The weight of these transitions is used in the computation of the conditional probabilities of the sequence of labels.

Some embodiments are based on recognition that GTC can be used to encode an N-best list of pseudo-label sequences into a graph for semi-supervised learning. To that end, some embodiments disclose an extension of GTC to model the posteriors of both labels and label transitions by a neural network, which can be applied to a wider range of tasks. The extended GTC (GTC-e) is used for the multi-speaker speech recognition task. The transcriptions and speaker information of multi-speaker speech are represented by a graph, where the speaker information is associated with the transitions and ASR outputs with the nodes. Using GTC-e, multi-speaker ASR modelling becomes very similar to single-speaker ASR modeling, in that tokens by multiple speakers are recognized as a single merged sequence in chronological order.

Additionally, methods of training a neural network model use loss function to learn a mapping of a sequence of inputs to a typically shorter sequence of output like CTC and Recurrent Neural Network Transducer (RNN-T) are commonly used loss functions in automatic speech recognition (ASR) technology. The CTC and RNN-T losses are designed for an alignment-free training of the neural network model to learn a mapping of a sequence of inputs (e.g., the acoustic features) to a typically shorter sequence of output labels (e.g., words or sub-word units). While the CTC loss requires neural network outputs to be conditionally independent, the RNN-T loss provides an extension to train a neural network whose output frames are conditionally dependent on previous output labels. In order to perform training without knowing the alignment between the input and output sequences, both loss types marginalize over a set of all possible alignments. Such alignments are derived from supervision information (the sequence of labels) by applying specific instructions that define how the sequence of labels is expanded to adjust to the length of the input sequence. In both cases, such instructions include the usage of an additional blank label and transition rules that are specific to the loss type.

However, altering a training lattice of transducer models to achieve a strictly monotonic alignment between the input and the output sequences, may leave other aspects of the RNN-T, such as the emission of ASR labels over a single time frame, unaltered.

Some embodiments are based on recognition of a GTC-Transducer (GTC-T) objective, which extends the GTC to conditional dependent neural network that outputs similar to RNN-T. In an embodiment, the GTC-T allows the user to define the label transitions in a graph format and by that to easily explore new lattice structures for transducer-based ASR. In an embodiment, a CTC-like lattice is used for training a GTC-T based ASR system. Further, the GTC-T objective allows usage of different graph topologies for constructing the training lattice, for example, a graph type corresponding to a CTC-like topology or a graph type corresponding to a MonoRNN-T (or RNA) loss type.

Accordingly, one embodiment discloses an end-to-end automatic speech recognition (ASR) system comprising: a processor; and a memory having instructions stored thereon. The processor is configured to execute the stored instructions to cause the ASR system to collect a sequence of acoustic frames providing a digital representation of an acoustic signal including a mixture of speeches performed by multiple speakers. The processor is further configured to encode each frame from the sequence of acoustic frames with a multi-head encoder encoding each frame into a likelihood of a transcription output and a likelihood of an identity of a speaker to produce a sequence of likelihoods of transcription outputs and a sequence of likelihoods of identities of the speakers corresponding to the sequence of acoustic frames. The processor further configured to decode the sequence of likelihoods of transcription outputs and the sequence of likelihoods of identities of the speakers with a decoder performing an alignment producing a sequence of transcription outputs annotated with identities of the speakers. Additionally, the processor configured to submit the sequence of transcription outputs annotated with the identities of the speakers into a downstream application.

Accordingly, one embodiment discloses a computer-implemented method for performing end-to-end ASR. The method comprising collecting a sequence of acoustic frames providing a digital representation of an acoustic signal including a mixture of speeches performed by multiple speakers. The method further comprising encoding each frame from the sequence of acoustic frames with a multi-head encoder encoding each frame into a likelihood of a transcription output and a likelihood of an identity of a speaker to produce a sequence of likelihoods of transcription outputs and a sequence of likelihoods of identities of the speakers corresponding to the sequence of acoustic frames. The method further comprising decoding the sequence of likelihoods of transcription outputs and the sequence of likelihoods of identities of the speakers with a decoder performing an alignment producing a sequence of transcription outputs annotated with identities of the speakers. Additionally, the method comprising submitting the sequence of transcription outputs annotated with the identities of the speakers into a downstream application.

BRIEF DESCRIPTION OF THE DRAWINGS

FIG. 11 illustrates Table 2 showing greedy search results for ASR performance of the ASR system based on GTC-e objective function based on oracle token error rates, in accordance with an example embodiment.

FIG. 12 illustrates Table 3 showing beam search results for ASR performance of the ASR system based on GTC-e objective function based on WERs, in accordance with an example embodiment.

FIG. 13 illustrates Table 4 showing beam search results for ASR performance of the ASR system based on GTC-e objective function based on WERs for multiple speakers, in accordance with an example embodiment.

FIG. 14A illustrates a neural network architecture of an ASR system implemented with the GTC-T objective function, in accordance with an example embodiment.

FIG. 14B illustrates a pseudo-code for beam search algorithm for GTC-T with a CTC-like graph, in accordance with an example embodiment.

FIG. 14D illustrates comparison of ASR results for CTC, RNN-T, and GTC-T losses on the LibriSpeech dataset benchmark, in accordance with an example embodiment.

DETAILED DESCRIPTION

Figure 1:
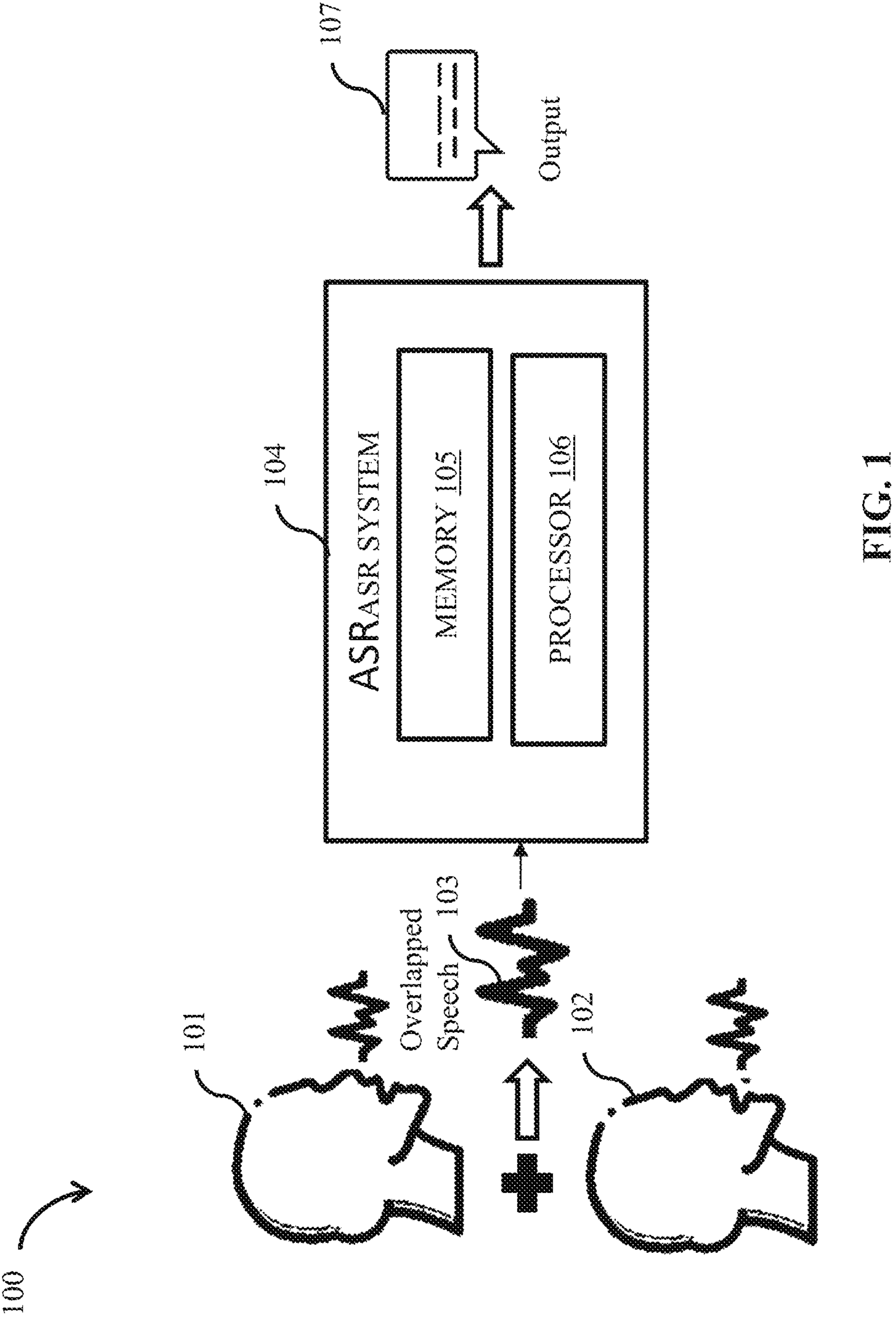
FIG. 1 is a block diagram illustrating an end-to-end automatic speech recognition (ASR) system, in accordance with an example embodiment.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In recent years, dramatic progress has been achieved in automatic speech recognition (ASR), in particular due to exploration of neural network architectures that improve the robustness and generalization ability of ASR model. The rise of end-to-end ASR models has simplified ASR architecture with a single neural network, with frameworks such as the connectionist temporal classification (CTC), attention-based encoder-decoder model, and a recurrent neural network-transducer (RNN-T). Additionally, graph modeling has traditionally been used in ASR, such as using hidden Markov model (HMM) based systems, a weighted finite-state transducer (WFST) is used to combine several modules together including a pronunciation lexicon, contextdependencies, and a language model. Recently, use of graph representations in the loss function for training deep neural networks has also been proposed, by means of a new loss function, called graph-based temporal classification (GTC), which is a generalization of CTC to handle sequence-to-sequence problems. GTC can take graph-based supervisory information as an input to describe all possible alignments between an input sequence and an output sequence, for learning the best possible alignment from the training data.

GTC is used to boost ASR performance via semi-supervised training by using an N-best list of ASR hypotheses that is converted into a graph representation to train an ASR model using unlabeled data. However, in the original GTC, only posterior probabilities of the ASR labels are trained, and trainable label transitions are not considered.

Some embodiments are based on realization that extending GTC to handle label transitions would allow modelling of information regarding the labels. For example, in a multispeaker speech recognition scenario, where some overlap between the speech signals of multiple speakers is considered, the transition weights may be used to model speaker predictions that are aligned with the ASR label predictions at frame level, such that when an ASR label is predicted it is also detected if it belongs to a specific speaker.

FIG. 1 is a block diagram 100 illustrating an end-to-end ASR system 104, in accordance with an example embodiment. The end-to-end ASR system 104 comprises a memory 105 that stores instructions stored thereon. The instructions are executed by a processor 106 to cause the end-to-end ASR system 104 to perform some operations. The operations of the end-to-end ASR system 104 are described below in the form of various embodiments.

In one embodiment, the end-to-end ASR system 104 is configured to collect a sequence of acoustic frames providing a digital representation of an acoustic signal including a mixture of speeches performed by multiple speakers. For example, a first speaker 101 outputs a first speech signal and a second speaker 102 outputs a second speech signal, which are overlapped and an overlapped speech 103 corresponding to the mixture of speeches of the first speaker 101 and the second speaker 102 are collected by the end-to-end ASR system 104. The end-to-end ASR system 104 includes an input interface that transforms this overlapped speech into a digital representation of an acoustic signal corresponding to a sequence of frames in the overlapped speech 103.

The overlapped speech 103 thus corresponds to input acoustic sequences which are processed by the end-to-end ASR system 104 to generate a sequence of transcription outputs 107 annotated with the identities of the speakers, which are submitted into a downstream application. Each transcription output sequence is a transcription of the utterance, or a portion of utterance represented by the corresponding input acoustic signal. For example, the end-to-end ASR system 104 can obtain the overlapped speech 103 (also interchangeable referred to hereinafter as the acoustic signal) and generate a corresponding transcription output 107 that is a transcription of the utterance represented by the input acoustic signal 103*a* and annotated with a speaker ID for at least one of the multiple speakers, such as the first speaker 101 or the second speaker 102.

The input acoustic signal 103 may include a sequence of multiple frames of audio data that is a digital representation of an utterance, e.g., a continuous stream of data. The sequence of multiple frames of audio data may correspond to a sequence of time steps, e.g., where each frame of audio data is associated with 25 milliseconds of audio stream data shifted 10 milliseconds further in time from the previous frame of audio data. Each frame of audio data in the sequence of multiple frames of audio data may include feature values for the frame that characterize the portion of the utterance at the corresponding time step. For example, the sequence of multiple frames of audio data may include filter bank spectra feature vectors.

The end-to-end ASR system 104 obtains input acoustic sequences and processes the input acoustic sequences to generate transcription output sequences. Each transcription output sequence is a transcription of the utterance, or a portion of utterance represented by the corresponding input acoustic signal. For example, the end-to-end ASR system 104 can obtain an input acoustic signal 103 corresponding to a mixture of the acoustic signals of multiple speakers, such as the first speaker 101 and the second speaker 102 and generate a corresponding transcription output 107 that is a transcription of the utterance represented by the input acoustic signal 103 by the multiple speakers, in a chronological order.

The transcription output 110 may include a sequence of transcription pieces of the utterance represented by the input acoustic signal 102. A transcription output may include one or more characters. For example, a transcription output may be a character or a sequence of characters from a Unicode character set. For example, the character set may include the alphabet of English, Asian, Cyrillic as well as Arabic languages. The character set may also include Arabic numerals, a space character, and punctuation marks. Additionally or alternatively, a transcription output can include bits, words, and other linguistic constructions.

Figure 2:
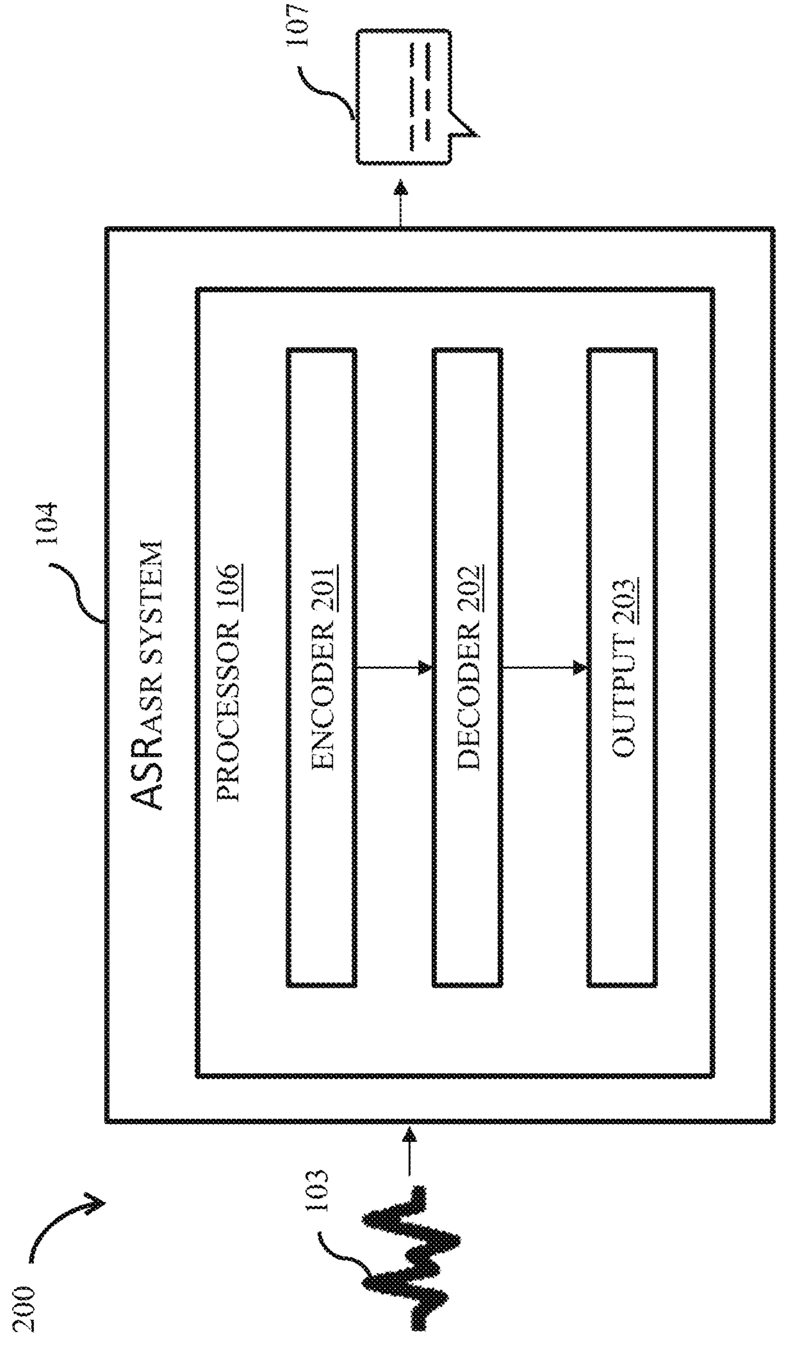
FIG. 2 illustrates a block diagram of internal components of the end-to-end ASR system of FIG. 1, in accordance with an example embodiment.

To that end, the end-to-end ASR system 104 is configured to perform a series of operations including an encoding operation, a decoding operation, and an output operation, which are illustrated by way of example in FIG. 2.

FIG. 2 illustrates a block diagram 200 of internal components of the end-to-end ASR system 104, according to some embodiments of the present disclosure. The end-to-end ASR system 104 includes an encoder 201, a decoder 202 and an output generation module 203. The encoder 201, the decoder 202 and the output generation module 203 are examples of operations that are performed by the end-to-end ASR system 104 through execution of stored computer instructions corresponding to each of these operations by the processor 106 executing these stored computer instructions.

The encoder 201 is a multi-head encoder with one head corresponding to each speaker of the multiple speakers, such as the first speaker 101 and the second speaker 102. The encoder 201 is configured to cause the end-to-end ASR system 104 encode each frame in the input sequence of acoustic frames of the input acoustic signal 103 with the multi-head encoder 201 encoding each frame into a likelihood of a transcription output and a likelihood of an identity of a speaker to produce a sequence of likelihoods of transcription outputs and a sequence of likelihoods of identities of the speakers corresponding to the sequence of acoustic frames of the input acoustic signal 103.

Further, the decoder 202 is configured to decode the sequence of likelihoods of transcription outputs and the sequence of likelihoods of identities of the speakers provided by the encoder 201. The decoder 202 is an alignment based decoder for producing an alignment of a sequence of transcription outputs annotated with identities of the speakers.

The sequence of transcription outputs annotated with the identities of the speakers is submitted by the output generation module 203 as the transcription output 107 into a downstream application. The downstream application may be an online streaming based application, such as an online music providing application, an online video rendering application, a sporting event livestreaming application, a live teleconferencing application and the like.

In an example, the for end-to-end ASR system 104 the encoder 201 is an acoustic encoder and the decoder 202 is an attention-based decoder. The acoustic encoder processes the input acoustic signal 103 and generates a sequence of encoder states providing alternative, e.g., higher, representations for the input acoustic signal 103. The sequence of encoder states may include an alternative sequence of multiple frames of audio data that correspond to a second set of time steps. In some implementations, the alternative representation for the input acoustic sequence is subsampled to a lower frame rate, i.e., the second set of time steps in the alternative representation is smaller than the first set of time steps in the input acoustic sequence. The attention-based decoder is trained to process encoder states representing alternative representations for the input acoustic signal 103 and generate transcription outputs from the sequence of encoder states provided to the attention-based decoder.

Some embodiments are based on recognition that an attention-based ASR system may need to observe an entire speech utterance segmented by speech pauses, to assign a weight to each input frame in order to recognize each transcription output 203. Due to the absence of a priori knowledge about which part of an input acoustic signal is relevant to recognize the next transcription output and the need to assign a weight to each encoder state, the attention-based decoder usually needs to process large input sequences. Such a processing allows taking advantage of placing attention to different parts of the utterance but also increases output delays, and thus is not practical for speech recognition in a streaming/online fashion.

Some embodiments are based on realization that an example of the a priori knowledge about relevancy of different parts of an input sequence to recognition of the next transcription output is an indication of locations of frames corresponding to the transcription outputs to be recognized in the input sequence. Indeed, if the transcription output locations are known, the attention-based decoder can be forced to place greater attention to these locations and less or no attention to other locations by restricting the input sequence. In such a manner, for each transcription output, the attention-based network can focus its attention on its location in the input sequence. This guided attention reduces the need to process large input sequences, which in turn reduces the output delays making the attention-based decoder practical for recognition in a streaming/online fashion.

To that end, the decoder 202 is an alignment decoder trained to determine locations of encoder states in the sequence of encoded states that encode transcription outputs, such as characters, bits, words, etc. For example, a connectionist temporal classification (CTC) is a type of objective function and associated neural network output for training recurrent neural networks (RNNs) such as long short-term memory (LSTM) networks to tackle sequence problems where the timing is variable. A CTC-based ASR system is an alternative to an attention-based ASR system. A CTC-based neural network generates an output for each frame of the input sequence, i.e., in- and outputs are synchronized, and a beam search algorithm is used to find the best output sequence before collapsing neural network outputs to an output transcription. The performance of attention-based ASR systems may be superior to CTC-based ASR systems. However, some embodiments are based on realization that the in- and output frame alignment used by intermediate operations of the CTC-based ASR system can be used by an attention-based ASR system to address its output delay drawbacks mentioned above.

Figure 3:
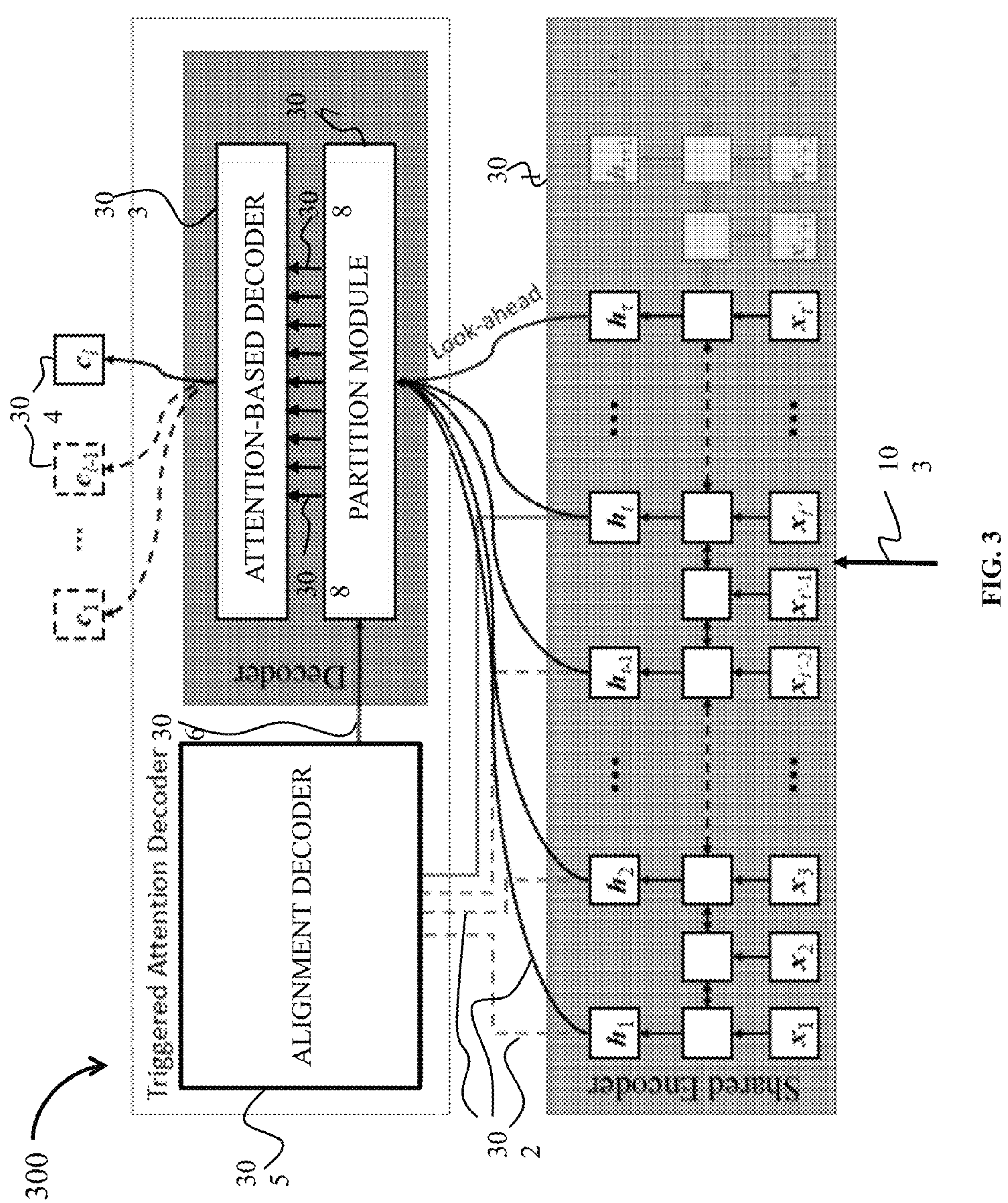
FIG. 3 illustrates an example architecture of the end-to-end ASR system of FIG. 1, in accordance with an example embodiment.

FIG. 3 illustrates an example architecture of such CTC-based ASR system 300 wherein the encoder 201 is a self-attention encoder 301. The CTC-based ASR system 300 also includes an attention based decoder 303.

The encoder 301 processes the input acoustic signal 103 and generates a sequence of encoder states 302 providing alternative, e.g., higher, representations for the input acoustic signal 103. The sequence of encoder states 302 may include an alternative sequence of multiple frames of audio data that correspond to a second set of time steps. The attention-based decoder 303 is trained to process the sequence of encoder states 302 representing alternative representations for the input acoustic signal 103 and generate transcription outputs 304 (corresponding to output 203) from the sequence of encoder states provided to the attention-based decoder 303.

The CTC-based ASR system 300 also includes the decoder 202 which is an alignment decoder 305 to take advantage from the alignment information 306. The alignment information 306 includes an alignment of a sequence of transcription outputs annotated with identities of the speakers in the multi-speaker input acoustic signal 103. The such CTC-based ASR system 300 includes a partition module 307 configured to partition the sequence of encoder states 302 into a set of partitions 308. For example, the partition module 307 may partition the sequence of encoder states for each location 306 of identified encoder states, such that a number of partitions 308 is defined by, e.g., equal to, a number of the identified encoder states 302 that encode transcription outputs. In such a manner, the attention-based decoder 303 accepts as an input not the entire sequence 302, but portions of that sequence 308, while each portion is likely to include a new transcription output to form the transcription output sequence 304. In some implementations, the combination of alignment decoder 305, attention-based decoder 303 and the partition module 307 is referred to as triggered attention decoder. In effect, the triggered attention decoder can process the portion of the utterance as it is received making the CTC-based ASR system 300 practical for recognition in a streaming/online fashion.

In some prior end-to-end ASR systems, label sequences for different speakers are supposed to be output at different output heads, or the prediction of the sequence for a speaker can only start when the sequence of the previous speaker completes.

However, the end-to-end ASR system 104 disclosed in various embodiments provided herein, the multi-speaker ASR problem is not implicitly regarded as a source separation problem using separate output layers for each speaker or cascaded processes to recognize each speaker one after another. Instead, the prediction of ASR labels of multiple speakers is regarded as a sequence of acoustic events irrespective of the source.

To that end, some embodiments use generalized form of CTC, disclosed previously at GTC and uses an extended GTC (GTC-e) loss to accomplish multiple speaker separation.

Figure 4:
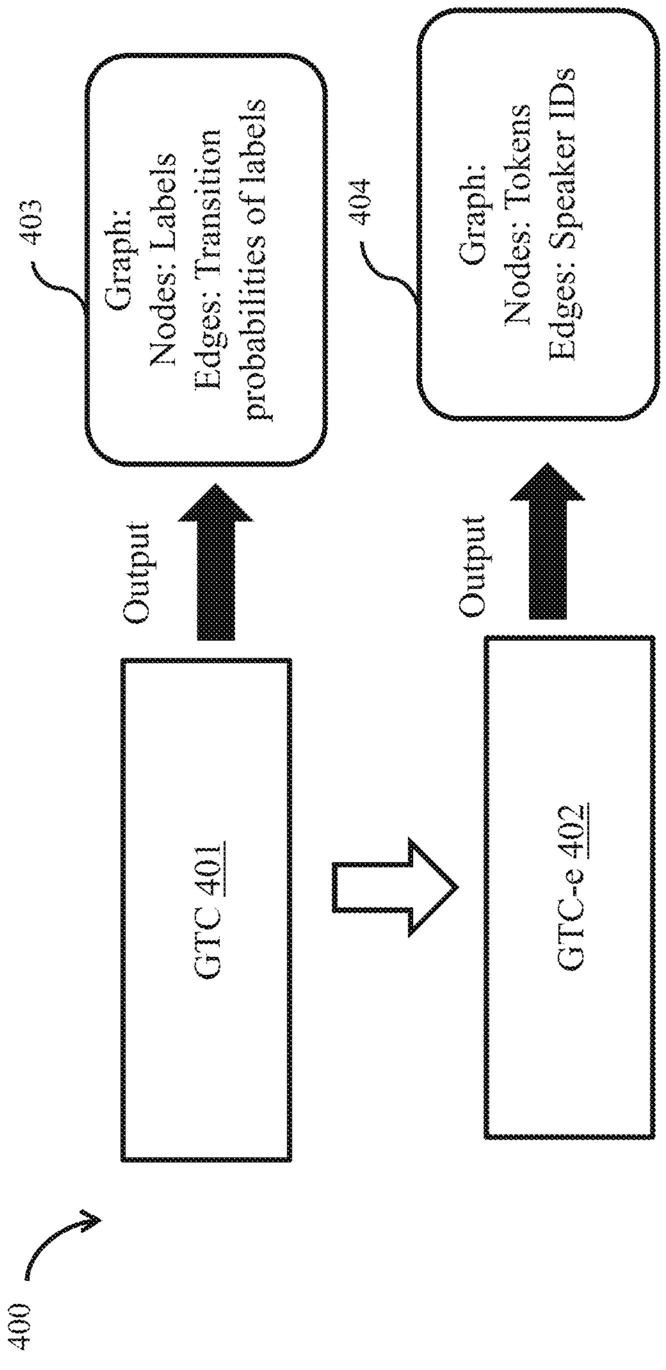
FIG. 4 illustrates extension of GTC for end-to-end ASR system for performing multiple speaker separation, in accordance with an example embodiment.

FIG. 4 illustrates a schematic 400 showing an extension of GTC 401 objective function for end-to-end ASR system 104 for performing multiple speaker separation, in accordance with some embodiments.

The GTC 401 objective function is extended to provide a GTC-e 402 loss which allows to train two separate predictions for the end-to-end ASR system 104, one for the speakers (such as speakers 101 and 102) and one for the ASR outputs (such as outputs 203), that are aligned at the frame level. In order to exploit the speaker predictions efficiently during decoding, an existing frame-synchronous beam search algorithm of GTC 401 is adapted to GTC-e 402.

The GTC 401 objective function provides an output in the form of a directed graph 403 where nodes represent labels and edges represent transitions of labels. On the other hand, the GTC-e 402 objective function provides as an output a directed graph 404 where nodes represent tokens and edges represent speaker identifications (IDs). Thus, the GTC-e 402 objective function is configured to perform multi-speaker ASR by considering the ASR outputs of multiple speakers as a sequence of intermingled events with a chronologically meaningful ordering.

To that end, the GTC-e 402 objective function is used as a loss function of a neural network, which is trained to receive an input sequence of labels corresponding to multiple speakers and provides as an output, chronologically separated labels and speaker identification for each label.

Figure 5:
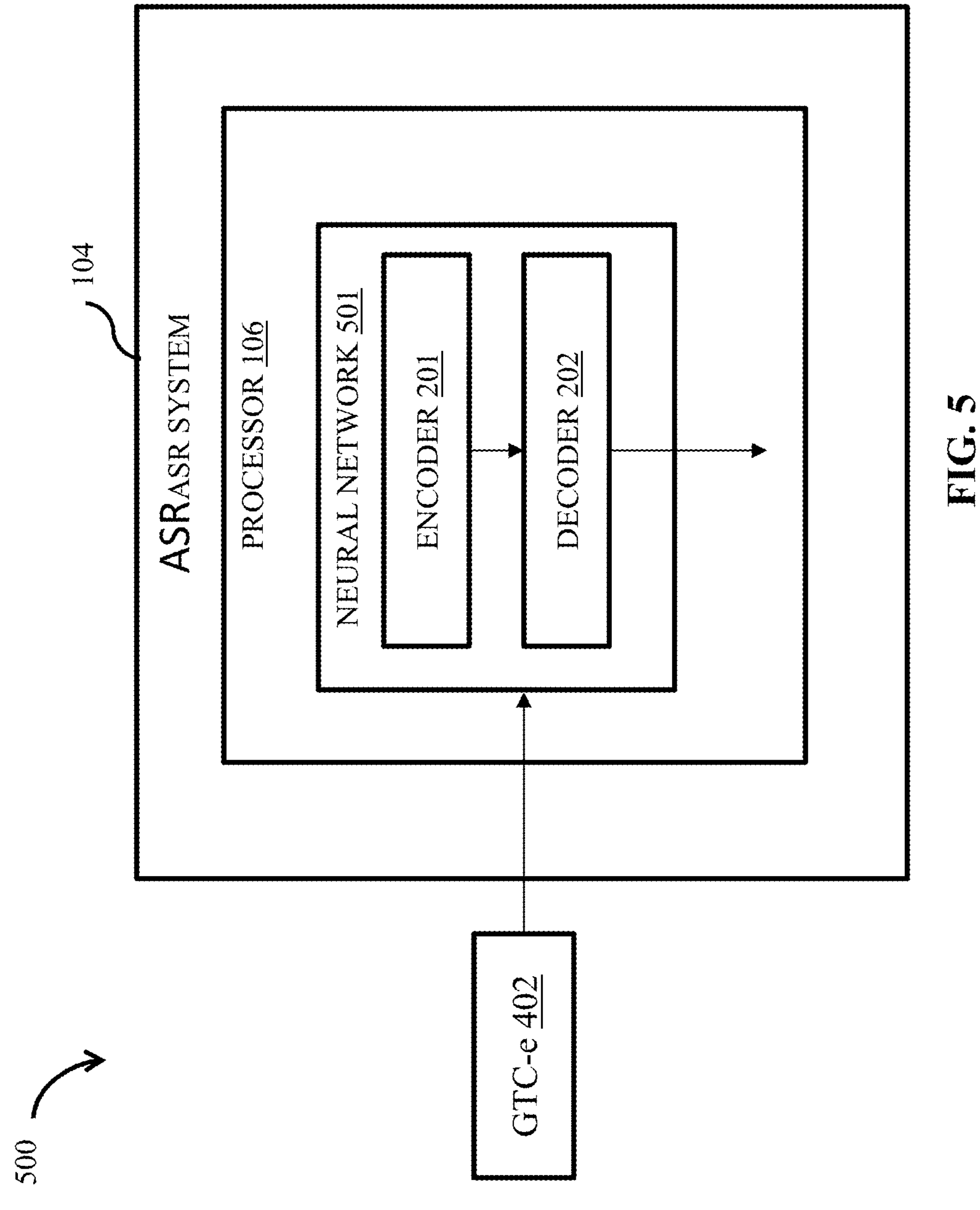
FIG. 5 illustrates an architecture of the end-to-end ASR system of FIG. 1 using a neural network trained on GTC-e objective function, in accordance with an example embodiment.

FIG. 5 illustrates an architecture of the end-to-end ASR system 104 using a neural network 501 trained on GTC-e 402 objective function. The neural network 501 incudes the encoder 201 and the decoder 202 which are described in FIG. 2. The neural network 501 is trained to achieve multiple objectives of speech recognition and speaker identification.

In various embodiments, the encoder 201 is a multi-head encoder and the decoder 202 is a time alignment decoder (as illustrated in FIG. 3). The multi-head encoder and decoder with a time alignment are a part of the neural network 501 trained end-to-end to recognize and/or transcribe the speech of each speaker. To that end, the neural network 501 is trained to achieve multiple objectives, i.e., speech recognition and speech identification. To achieve this training, in some implementations, the neural network 501 is trained using multiple loss functions—one for speech recognition and another one for speaker identification. Doing in such a manner allows to simplify the construction of the loss function and/or reuse legacy loss functions designed for different applications.

To that end, the neural network 501 is trained to minimize a loss function which includes a first component associated with an error in speech recognition and a second component associated with an error in speaker identification.

However, employing multiple loss functions or multiple components of the loss function may create a synchronization problem of outputs of different heads of the multi-head encoder. This is because there is no alignment information between the acoustic frames of the input acoustic signal 103 and the labels, so separately aligning each transcription and each speaker ID information will result in inconsistent alignments. To that end, some embodiments train the multi-head encoder 201 of the neural network 501 using a single loss function configured to minimize an error in speech recognition and speaker identification simultaneously.

Some embodiments are based on a recognition that training the end-to-end ASR system 104 can be performed using a CTC objective allowing the decoder 202 to enforce the alignment. For example, in speech audio, there can be multiple time slices that correspond to a single phone. Since the alignment of the observed sequence with the target labels is unknown, the training with the CTC objective predicts a probability distribution at each time step.

The CTC objective uses a graph-based loss function to train the neural network 501 when there is no temporal alignment information available between a sequence of training labels and a longer sequence of label probabilities outputted by the neural network 501, which is computed from a sequence of observations inputted to the neural network 501. Such missing temporal alignment information creates a temporal ambiguity between the sequence of label probabilities outputted by the neural network 501 and the supervision information for the training, which is the sequence of training labels that can be resolved using the CTC objective function.

However, the CTC objective function is suitable only to resolve the temporal ambiguity during the training of neural networks. The CTC objective function would fail if other types of ambiguities need to be considered. Hence, it is an object of some embodiments to enhance the CTC objective function to consider other ambiguities, like speaker identification.

Some embodiments are based on the realization that while the definition of the CTC objective and/or the CTC rules is not graph-based, the problem or limitation of the CTC objective can be illustrated by a directed graph and be solved using a graph-based definition. Specifically, if the CTC rules make the supervisory information of the training label sequence reside on a graph that enforces the alignment between the sequence of label probabilities generated by a neural network and the sequence of training labels, it would be advantageous to extend the principles of this graph to address the speaker alignment.

In an example, the neural network 501 is trained using an extended CTC objective function. As is known that GTC is a generalized form of CTC objective function, therefore, in one embodiment, the neural network 501 is trained used GTC-e 402 objective function, also referred to as GTC-e 402 loss function. The GTC-e 402 objective function (or extended CTC objective function) is used to enforce an alignment between an input and an output on a graph with nodes indicative of speech identification outputs, which are also know a transcription outputs. The edges of the graph are indicative of transitions between multiple speakers. Such a graph is illustrated in FIG. 6.

Figure 6:
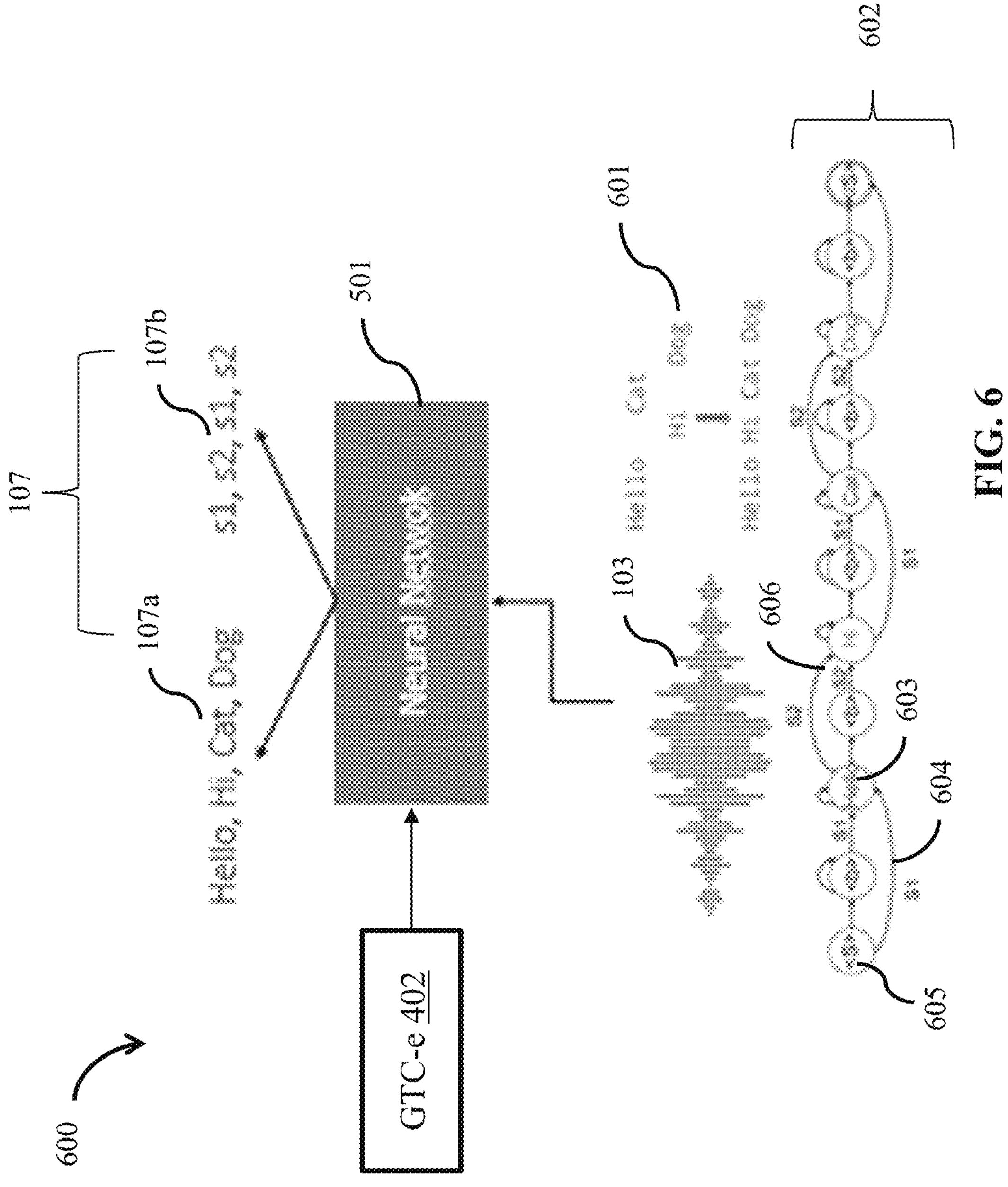
FIG. 6 illustrates working example of the neural network of FIG. 5, in accordance with an example embodiment.

FIG. 6 illustrates working example 600 of the neural network 501, in accordance with an example embodiment. The working example 600 illustrates a graph 602 with multiple nodes and edges. Such as a node 603 is depicted with text "Hello" and an edge 604 is depicted with text "s1". In the graph 602, each node represents a label and an edge connecting two nodes represents a likelihood of transition between these two nodes. Some embodiments are based on understanding that one way to address the speaker ambiguity is to annotate nodes and edges with not only the labels but also with the identities of a speaker. Thus, in the graph 602, the nodes, such as the node 603, the node 605, and the like are associated with labels indicating ASR outputs. For example, the node 603 is associated with the label "Hello", the node 605 indicates start node, and the edge 604 indicates a speaker with identity s1, an edge 606 indicates a speaker with identity s2. Similarly other nodes and edges in the graph 602 are annotated, however all the annotations are not shown for the sake of brevity, and not to limit the scope of the present disclosure.

Additionally, or alternatively, some embodiments are based on understanding that in the graph 602, for every ASR output, in the form of labels on nodes, a speaker label is predicted at frame level, in the form of annotations on edges. The speaker information can be regarded as a transition probability in the graph 602, and such annotation allows synchronization of the speaker and ASR label predictions at frame-level.

As illustrated in FIG. 6, a multi-speaker overlapped speech input acoustic signal 103 is received by the neural network 501. For the sake of brevity, the overlapped speech input acoustic signal 103 is formed by overlapping speech from two speakers, s1 and s2 (which are shown as the first speaker 101 and the second speaker 102 respectively in FIG. 1). The speaker s1 has utterance "Hello Cat" and the speaker s2 has utterance "Hi Dog". The neural network 501 processes the overlapped speech input acoustic signal 103 using the encoder 201 and the decoder 202, and based on the extended CTC objective function, the GTC-e 402 objective function. As a result of the processing, the graph 602 is obtained where nodes of the graph 602 indicate transcription output corresponding to the utterances, "Hello", "Hi", "Cat", and "Dog" in chronological order, and the edges give corresponding speaker IDs, s1, s2, s1, and s2 in the chronological order. The transcription output 107 from the neural network 501 thus comprises both, label outputs **107*a* and speaker identification outputs 107*b*, which are synchronized. This synchronization is done per frame of the input acoustic signal 103**.

In an embodiment, the GTC-e 402 objective function uses supervisory information from a directed graph of nodes connected by edges representing labels and transitions among the labels, wherein the directed graph represents possible alignment paths for a sequence of probability distributions outputted by the neural network 501 and the labels. The explanation of the GTC-e 402 objective function is covered in following description.

In order to understand the principles of GTC-e 402 objective function, the principles of a GTC objective function need to be understood first.

Figure 7A:
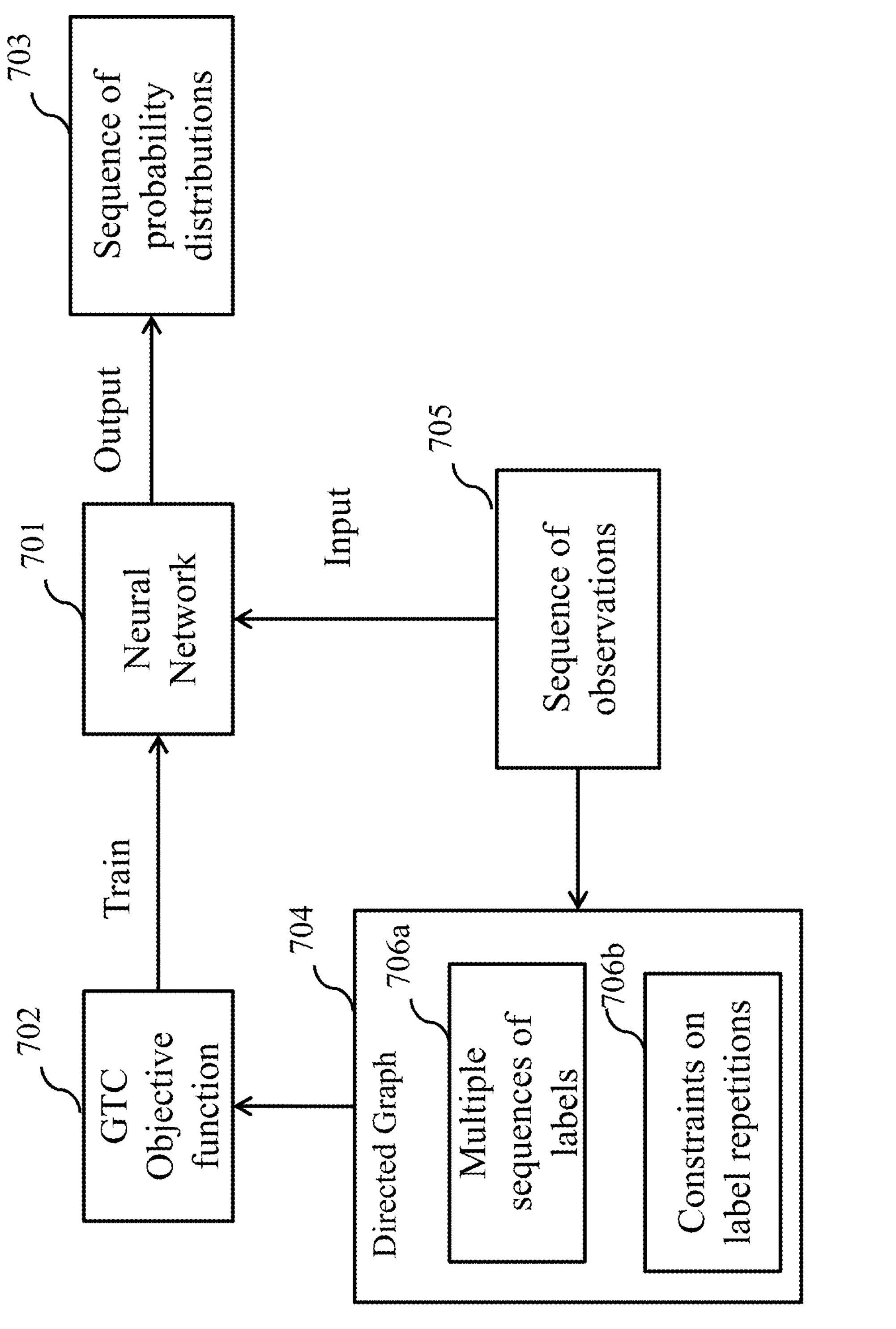
FIG. 7A is a schematic diagram illustrating a workflow of training a neural network using a graph-based temporal classification (GTC) objective function, in accordance with an example embodiment.

FIG. 7A is a schematic diagram illustrating a workflow of training a neural network 701 using a graph-based temporal classification (GTC) objective function 702, in accordance with an example embodiment. The neural network 701 is trained to output a sequence of probability distributions 703 for a sequence of observations 705, where the sequence of probability distributions 703 denotes the label probabilities at each instance of time. The type of the sequence of observations 705 inputted to the neural network 701 and the multiple sequences of labels **706*a* depend on the type of application in which the neural network 701** is being used.

For example, for the neural network 701 associated with an ASR system, the sequences of observations 705 provided at an input interface of the neural network 701 are associated with speech utterances and the multiple sequences of label **706*a* may correspond to words, sub-words, and/or characters from the alphabet of a particular language. Further, in an acoustic event detection application, where the neural network 701 may be trained to detect different acoustic events that occurred in a specific span of time in an acoustic scene, the sequence of observations 705 may comprise different audio features of sounds comprised in the specific span of time in the acoustic scene. In this case, the multiple sequences of labels 706*a* may comprise labels corresponding to different entities producing the sound or causing the acoustic event. For example, for meowing sound in the acoustic scene—a label "cat sound" may be used, similarly, for barking sound—a label "dog sound" may be used. Thus, the sequence of observations 705 and the multiple sequences of labels 706*a*** vary depending on the application.

The neural network 701 is trained using the GTC objective function 702, where the GTC objective function 702 uses supervisory information from a directed graph 704. The directed graph 704 comprises a plurality of nodes connected by edges, where the edges represent labels and transitions among the labels. Some embodiments are based on a realization that presenting the supervisory information on a directed graph 704 allows applying different rules for training the neural networks in a manner consistent with principles of such training. This is because the structure of the directed graph 704 is consistent with the differentiable approach used by the forward-backward algorithms of the training. Thus, if a rule desired to be imposed on the training is represented as part of the structure of the directed graph 704, such a rule can be imposed on the training in a differentiable manner consistent with the forward-backward algorithms.

For example, in one embodiment, the directed graph 704 represents multiple possible alignment paths for the sequence of probability distributions 703 and the multiple sequences of labels 706*a*. Such a directed graph allows using the GTC objective to train the neural network 701 to perform the alignment between its input and outputs in both the time and label domain. To achieve this multi-alignment, a structure of the directed graph 704 is non-monotonic, i.e., specifies a non-monotonic alignment between a sequence of labels of the multiple sequences of labels 706*a* and the sequence of probability distributions 703.

Additionally or alternatively, in one embodiment, the directed graph 704 represents a constraint 706*b* on label repetitions. The constraint 706*b* on label repetition specifies a minimum number of repetitions of a label, a maximum number of repetitions of the label, or both. The constraint 706*b* on label repetition can reduce the number of possible sequences of labels that can be generated during the unfolding of the directed graph 704 for the time alignment and speed up the computation of GTC loss.

The sequence of observations 705 may correspond to features extracted by a feature extraction method. For example, the observations may be obtained by dividing the input signal into overlapping chunks and extracting features from each of the chunks. The type of extracted features may vary depending on the type of input. For example, for the speech utterances, features extracted from a chunked sequence of audio samples may comprise a spectral decomposition of the input signal and additional signal processing steps to mimic the frequency resolution of the human ear. For example, each feature frame extracted from the input speech utterance may correspond to a time instance in the sequence of observations 705, e.g., where each frame of the speech utterance is associated with 25 milliseconds of audio samples shifted 10 milliseconds further in time from the previous frame of the speech utterance. Each feature frame of the speech utterance in the sequence of feature frames of the speech utterance may include acoustic information that characterizes the portion of the utterance at the corresponding time step. For example, the sequence of feature frames of audio data may include filter bank spectral energy vectors.

Inputs and Outputs of the Neural Network

In various embodiments, an input to the neural network 701 is a sequence of observations 705 and an output of the neural network 701 is the sequence of probability distributions 703 (also known as likelihoods) over a set of labels. For clarity of explanation, the probability distribution 703 generated by the neural network 701 is explained below using an exemplary embodiment, where the neural network 701 is trained for automatic speech recognition (ASR). However, this example is not intended to limit the scope, applicability, or configuration of embodiments of the present disclosure.

Figure 7B:
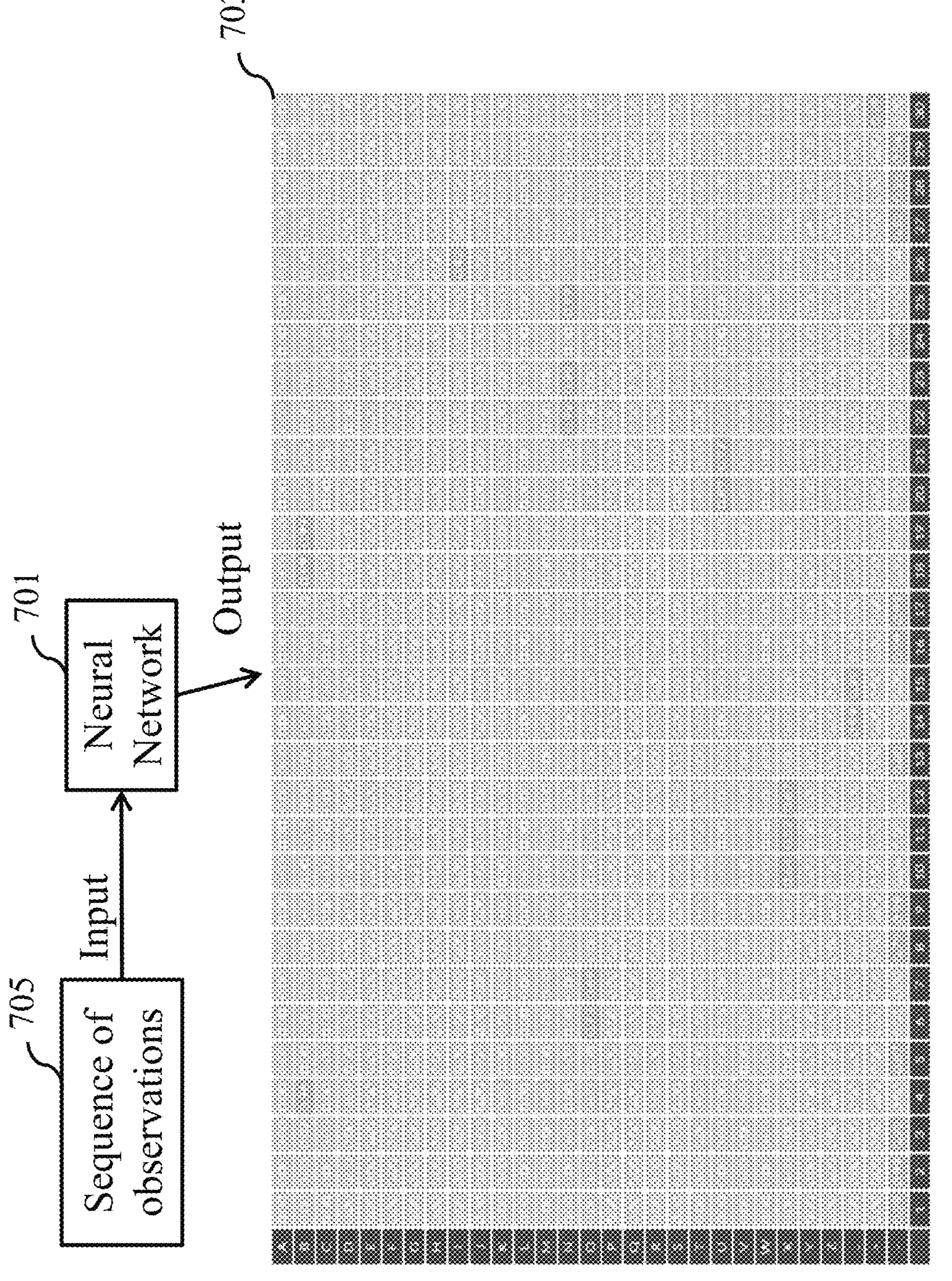
FIG. 7B illustrates a sequence of probability distribution outputted by a neural network, in accordance with an example embodiment.

FIG. 7B illustrates the sequence of probability distribution 703 computed from the multiple sequences of observations 705 by the neural network 701 trained for ASR in accordance with an example embodiment. FIG. 7B is explained in conjunction with FIG. 7A. The input to the neural network 701 includes a sequence of observations 705 with features extracted from a speech utterance. The neural network 701 is trained based on supervisory information including the directed graph 704 encoding possible speech recognitions having some ambiguities.

The directed graph 704 and the sequence of probability distributions 703 are processed by the GTC objective function 702 to optimize the temporal and label alignment of labels in the directed graph 704 for an input sequence of observation and to determine the gradients for updating the parameters of the neural network 701. The neural network 701, trained using the GTC objective function 702, produces a matrix of the sequence of probabilities 703, where columns correspond to timesteps, and each row corresponds to a label (here a letter in the English alphabet).

In the example of FIG. 7B, the neural network 701 outputs a D×T dimensional matrix (where D denotes the label dimension and T the time dimension, where D=29 and T=30 in the given example) or sequence of probability distributions 703, where letters of the English alphabet and some special characters correspond to the D=29 labels. Each column (D-dimension) in the D×T matrix corresponds to probabilities that sum to one, i.e., the matrix denotes a probability distribution over all labels for each timestep. In this example, the labels correspond to characters of the English alphabet from A-Z plus the extra symbols "_", ">", and "-", where "-" denotes a blank token or a blank symbol. The sequence of probability distributions 703 defines probabilities of different labels for each time step, which is computed from the sequence of observations 705 by the neural network 701. For example, as observed in FIG. 7B, the probability at the fourth time step to observe a label "B" is 96%, the probability of the label "O" is 3% and the probability of the remaining labels is close to zero. Hence, the most likely sequences of labels in the outputs of this example would have either the letter "B" or "O" at the fourth time position. At inference time, the final sequence of labels may be extracted from the sequence of probability distributions 703 over the labels using various techniques such as prefix beam search.

Further, by using the GTC objective the neural network 701 is trained to maximize the probability of the sequences of labels, in the sequence of probability distributions 703, corresponding to a sequence of nodes and edges that are comprised by the directed graph 704. For example, assume that the ground-truth transcription of input speech utterance corresponds to "BUGS_BUNNY", however, the ground-truth transcription is unknown. In such a case, the directed graph 704 may be generated from a list of ASR hypotheses for the speech utterance corresponding to "BUGS_BUNNY". For example, the list of ASR hypotheses represented by the directed graph 704 may be "BOX_BUNNY", "BUGS_BUNNI", "BOG_BUNNY", etc. (here each letter of the English alphabet corresponds to a label). Since it is unknown if any of the hypotheses is correct or what parts of a hypothesis are correct, such a list of multiple hypotheses for the speech utterance corresponding to "BUGS_BUNNY" contains ambiguous label information unlike the ground truth information of just "BUGS_BUNNY."

During GTC training the directed graph 704 will be unfolded to the length of the sequence of probability distributions 703, where each path from a specific start node to a specific end node in the unfolded graph denotes an alignment path and label sequence. Such a graph can comprise a non-monotonic alignment between the sequence of probability distributions 703 outputted by the neural network 701 and the sequences of labels 706*a* encoded in the graph. One of the alignment paths comprised by the directed graph 704 may correspond to the sequence of labels: "-BOOXXX_B-BUUN-NI", "B-OOX-_-BUNN-NY-", "BU-GS-_-BUN-N-Y-", and the likes (where "-" denotes a blank symbol). Each sequence of labels in the directed graph 704 comprises temporal alignment and label alignment. The temporal and label alignment of the labels in the directed graph 704 and the sequence of probability distributions 703 is optimized by the GTC objective function 702 by processing the directed graph 704 and training the neural network 701. The GTC objective function 702 is used to train the neural network 701 to maximize the probability of sequences of labels that are comprised by the directed graph 704. Transition weights residing on the edges of the directional graph 704 may be used during training to emphasize more likely alignment paths. To that end, in an example embodiment, each hypothesis may be provided with a score by the neural network 701. Further, each hypothesis may be ranked based on the score. Further, based on the ranking, weights may be assigned to transitions corresponding to each hypothesis such that weights of transitions corresponding to the first ranked hypothesis are more than weights of transition corresponding to the subsequent hypothesis of the N-best hypotheses. For example, a hypothesis "BOG" may have a higher rank compared to another hypothesis "BOX", based on contextual information. Hence, the weight connecting the labels "O" and "G" may be greater than the weight of the connections between "O" and "X". Accordingly, a sequence of labels with higher transition weights will be assigned with a higher probability score and thus, are selected to correctly transcribe the input speech utterances.

The Directed Graph With Non-Monotonic Alignment

In some embodiments, the supervisory information is comprised by the structure of the directed graph 704, where the supervisory information is used by the GTC objective function 702 to resolve one or more ambiguities such as temporal and label ambiguities to train the neural network 701. Thus, the supervisory information specifies one or a combination of a non-monotonic alignment between the multiple sequences of labels 706*a* and the sequence of probability distributions 703. Based on the non-monotonic alignment the directed graph 704 can output multiple unique label sequences.

Figure 7C:
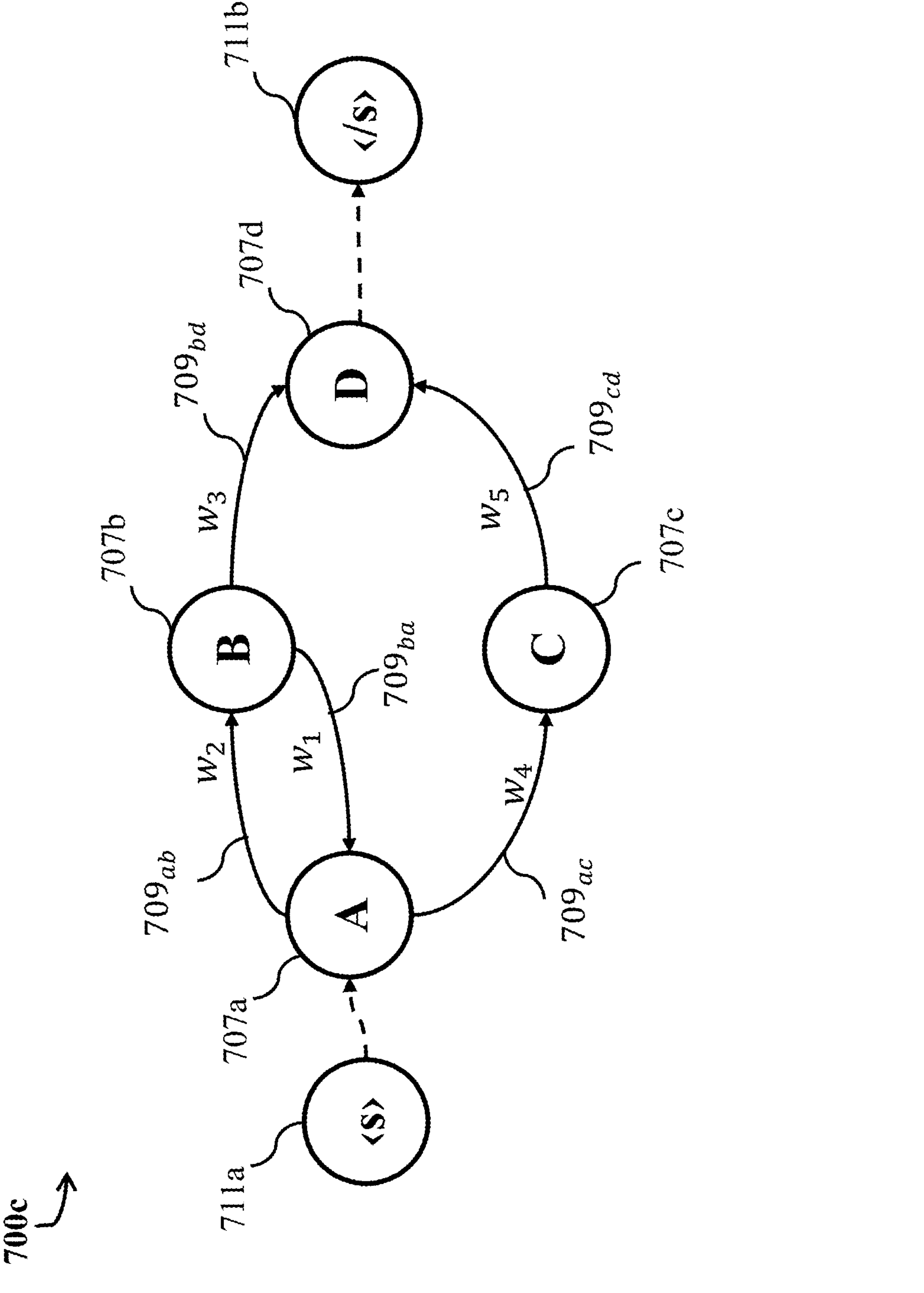
FIG. 7C illustrates an exemplary directed graph, in accordance with an example embodiment.

FIG. 7C illustrates an exemplary directed graph 700*c* in accordance with an example embodiment. The directed graph 700*c* includes multiple nodes 707*a*, 707*b*, 707*c*, and 707*d* where each node represents a label. For example, node 707*a* represents a label "A", 707*b* represents a label "B", node 707*c* represents a label "C", and node 707*d* represents a label "D". The directed graph 700*c* starts with a start node 711*a* and ends with an end node 711*b*. In the FIG. 7C, the start, and the end nodes are connected to the labels with dashed lines to illustrate that there could be other nodes in the directed graph 700*c* not shown for the simplicity and clarity of illustration.

The directed graph 700*c* is a non-monotonic directed graph thereby providing a non-monotonic alignment between a sequence of labels of the directed graph 700*c* and the sequence of probability distributions 703 outputted by the neural network 705 during the training. In different embodiments, the non-monotonic alignment can be implemented differently to enable multiple paths through the nodes of the directed graph 700*c* capturing the label and time ambiguities.

For example, as illustrated in FIG. 7C, the non-monotonic alignment in the directed graph 700*c* can be structured by connecting at least one node to different nodes representing different labels. For example, node 707*a* representing a label A is connected by an edge 709*ab* to a node 707*b* representing a label B, and also connected by an edge 709*ac* to a node 707*c* representing a label C. Such a split connection allows creating multiple different sequences of labels defined by multiple different paths through the graph, such as a sequence ABD and a sequence ACD sandwiched between the start node and the end node.

Another example of non-monotonic alignment encoded in the structure of the directed graph 700*c* is a loop formed by edges connecting multiple non-blank nodes. In the directed graph 700*c*, the loop is formed by edges 709*ab* and 709*ba* allowing making multiple paths through the graph, such as ABACD or ABABD.

Some embodiments are based on the realization that because the non-monotonic directed graph 700*c* encodes different sequences of labels, not all sequences are equally probable. Hence, there is a need to impose unequal probability on the structure of the directed graph 700*c*.

An additional advantage of the directed graph 700*c* is its ability to encode the probability of transitions, as weights of the edges, which in turn encodes the probability of different paths. To that end, at least some edges, in the non-monotonic directed graph 700*c*, are associated with different weights (w), making the directed graph 700*c* a weighted directed graph 700*c*. For example, an edge 709*ab* may be weighted with weight $w_2$, an edge 709*ba* may be weighted with weight $w_1$, an edge 709*bd* may be weighted with weight $w_3$, an edge 709*ac* may be weighted with weight $w_4$, and an edge 709*cd* may be weighted with weight $w_5$. Further, based on the weights, conditional probabilities of sequences of nodes may be varied. For example, if the weight $w_2$ is greater than the weight $w_1$, then in a specific sequence of nodes conditional probability of transition from node 707*a* to node 707*b* is more than the conditional probability of transition from node 707*b* to node 707*a*.

The Directed Graph With a Constraint on Label Repetition

Figure 7D:
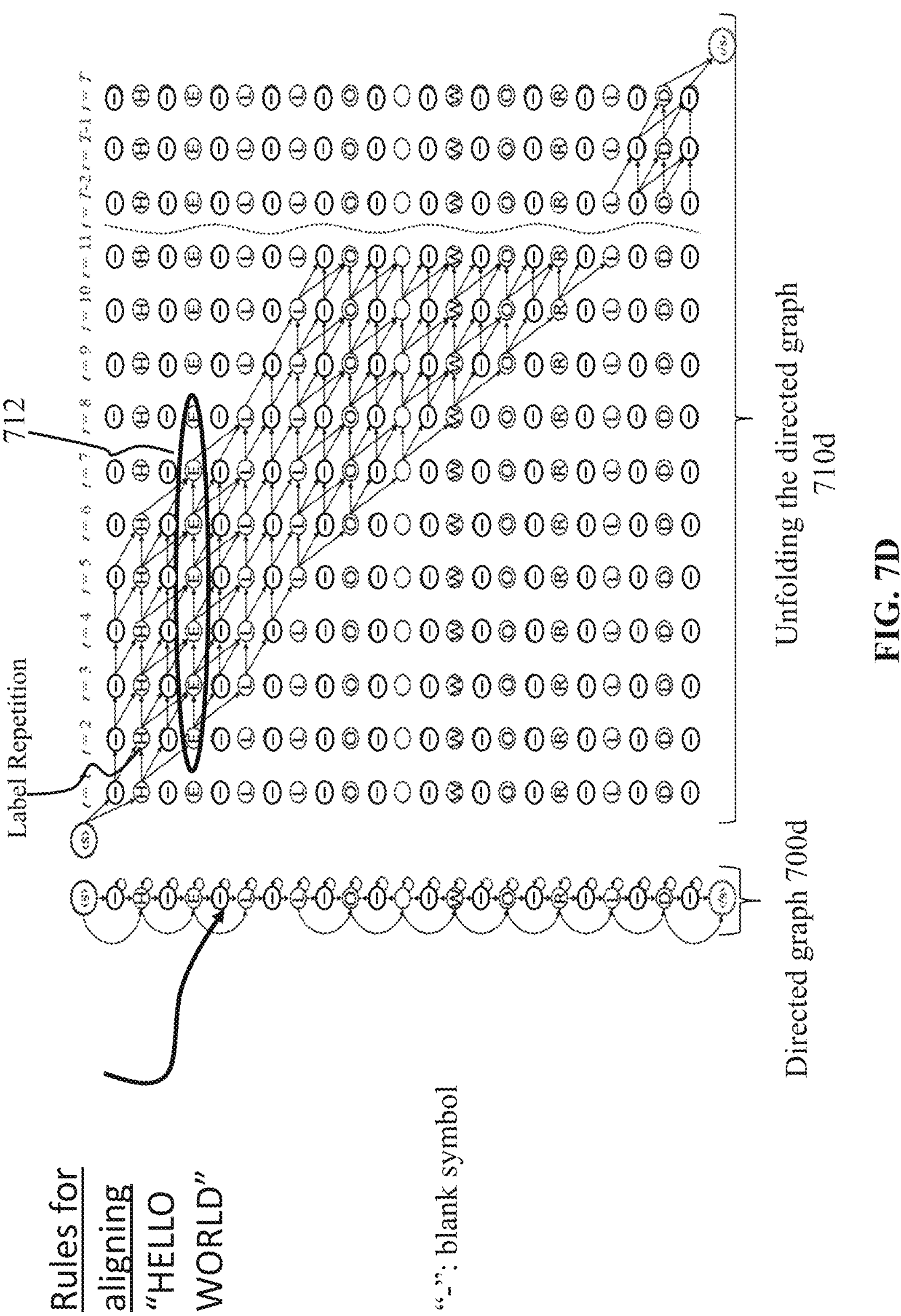
FIG. 7D illustrates an example of possible unconstraint repetition of a label during the unfolding of a directed graph, in accordance with an example embodiment.

FIG. 7D illustrates the repetitions of a label during the unfolding of a directed graph 700*d*, in accordance with an example embodiment. FIG. 7D comprises a directed graph 700*d* on the left side with the unfolded directed graph 710*d* on the right side. The directed graph 700*d* comprises a sequence of labels corresponding to a transcription "HELLO WORLD". Suppose there are more observations in a sequence of observations 705 provided to a neural network 701 than labels in a sequence of labels, i.e. transcription. For example, the number of letters in the transcription "HELLO WORLD" is 10 and the number of observations (and corresponding conditional probabilities) may be 30. Therefore, in order to match or align the number of labels to the number of observations, some labels in the transcriptions are repeated during the unfolding of the graph. For example, the letter "E" in the transcription "HELLO WORLD" may be repeated several times.

However, due to the lack of constraints on the number of times a label can be repeated causes unnecessary wastage of computation power as the GTC objective function is required to analyze possible transitions from each of the repeated labels. To that end, the directed graph 700*d* comprises constraints 706*b* on label repetitions. The constraints 706*b* in the directed graph 700*d* may comprise a minimum number of times a label is allowed to repeat in a sequence of labels or a maximum number of times a label is allowed to repeat in a sequence of labels, or both. This is because it is unlikely to observe the letter "E" over so many consecutive time frames as in exemplar unfolding 712.

Hence, additionally or alternatively to the non-monotonic alignment of the directed graph 700*d*, some embodiments use the structure of the directed graph 700*d* to impose a constraint on label repetitions during the training specifying a minimum number of repetitions of a label, a maximum number of repetitions of the label, or both. Such a constraint on label repetition of a node representing a label can be achieved by removing a self-transition of the node and add to the node the transition to other nodes representing the same label.

Figure 7E:
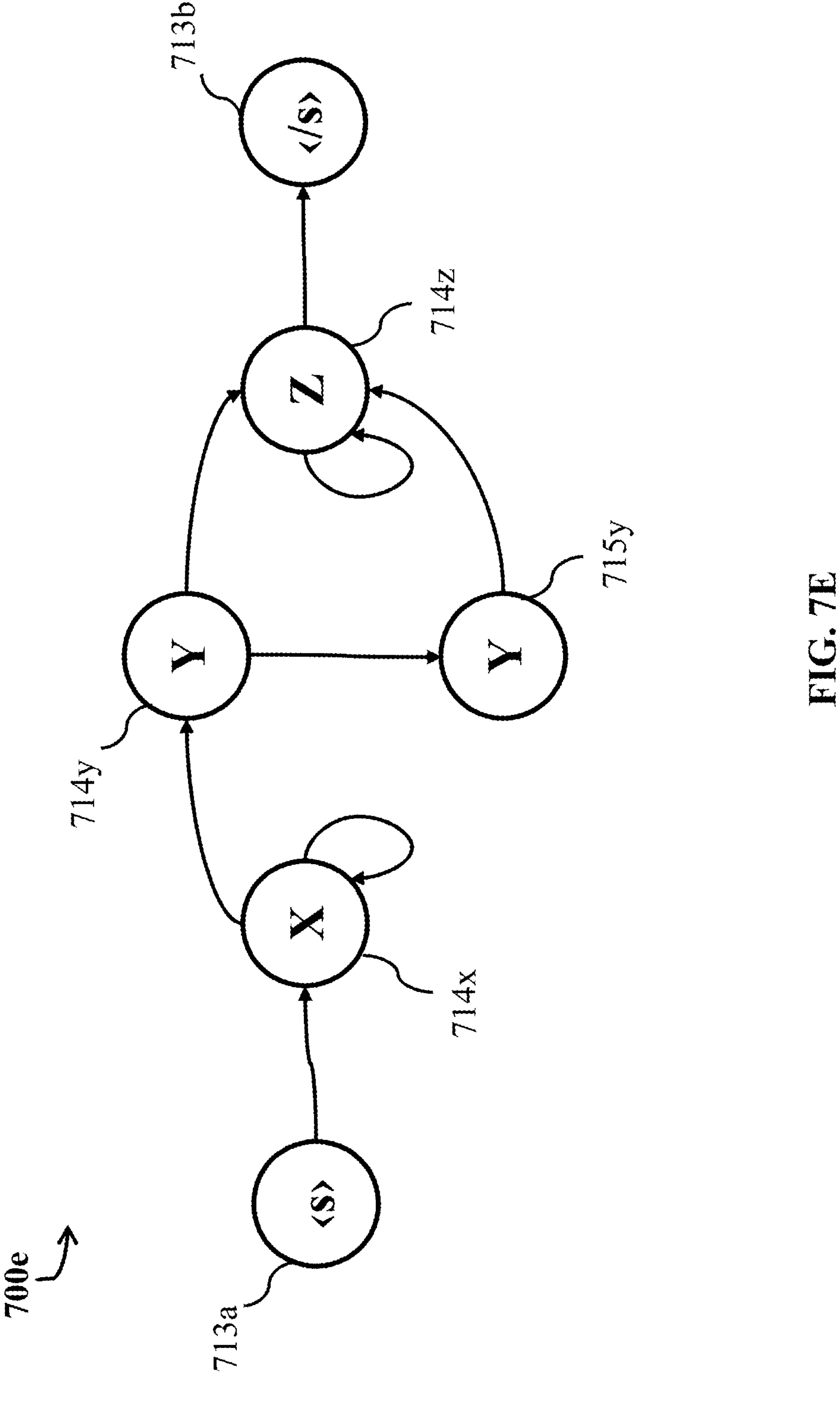
FIG. 7E illustrates an exemplary monotonic directed graph, in accordance with an example embodiment.

FIG. 7E illustrates an exemplary directed graph 700*e* with a constraint 706*b* on a label repetition, in accordance with an example embodiment. The directed graph 700*e* starts with a start node 713*a* and ends with an end node 713*b*. The monotonic directed graph 700*e* includes multiple nodes 714*x*, 715*y*, 714*y*, and 714*z* where each node represents a label. For example, node 714*x* represents a label "X", 714*y* represents a label "Y", node 714*z* represents a label "Z" and 715*y* represents another label "Y". In this example, a sequence of connected nodes representing the same label is formed by nodes 714*y* and 715*y*.

The directed graph 700*e* is monotonic because while there are multiple paths through the nodes of the graph connecting the start and the end node, after the collapsing procedure, only a single sequence of labels XYZ can be formed.

For example, the monotonic directed graph 700*e* graph may specify different sequences of labels such as X→X→X→Y→Z→Z→ or X→Y→Y→Z or X→Y→Z during the unfolding of the monotonic directed graph 700*e*. However, after collapsing these label sequences only one label sequence is generated which is X→Y→Z. In some embodiments, multiple monotonic directed graphs may be combined to form a non-monotonic directed graph (such as the non-monotonic directed graph 700*c*), which is used in training the neural network 701.

Further, in the monotonic directed graph 700*e*, it may be defined that a particular label, for example, label "Y", should not be repeated more than twice and that labels "X" and "Z" can be repeated for multiple numbers of times. This information is encoded in the structure of the graph and is used during the unfolding in an automatic manner. For example, nodes 714*x* and 714*z* have self-transitions, and thus can be repeated any number of times that are allowed by the unfolding. In contrast, nodes 714*y* and 715*y* corresponding to label "Y" do not have the self-transition. Hence, to travel through the graph between the start and the end node, the path could be 714*x*-714*y*-714*z*, in which label "Y" corresponding to the node 714*y* is repeated once or 714*x*-714*y*-715*y*-714*z*, in which label "Y" corresponding to the nodes 714*y* and 715*y* is repeated twice. Further, the directed graph 700*e* allows to modify or constrain repetition of other labels such as labels "X" and "Z" which are currently repeated multiple times without any constraints. The directed graph 700*e* may be modified to the directed graph 700*f* to put constraints on other labels "X" and "Z".

Figure 7F:
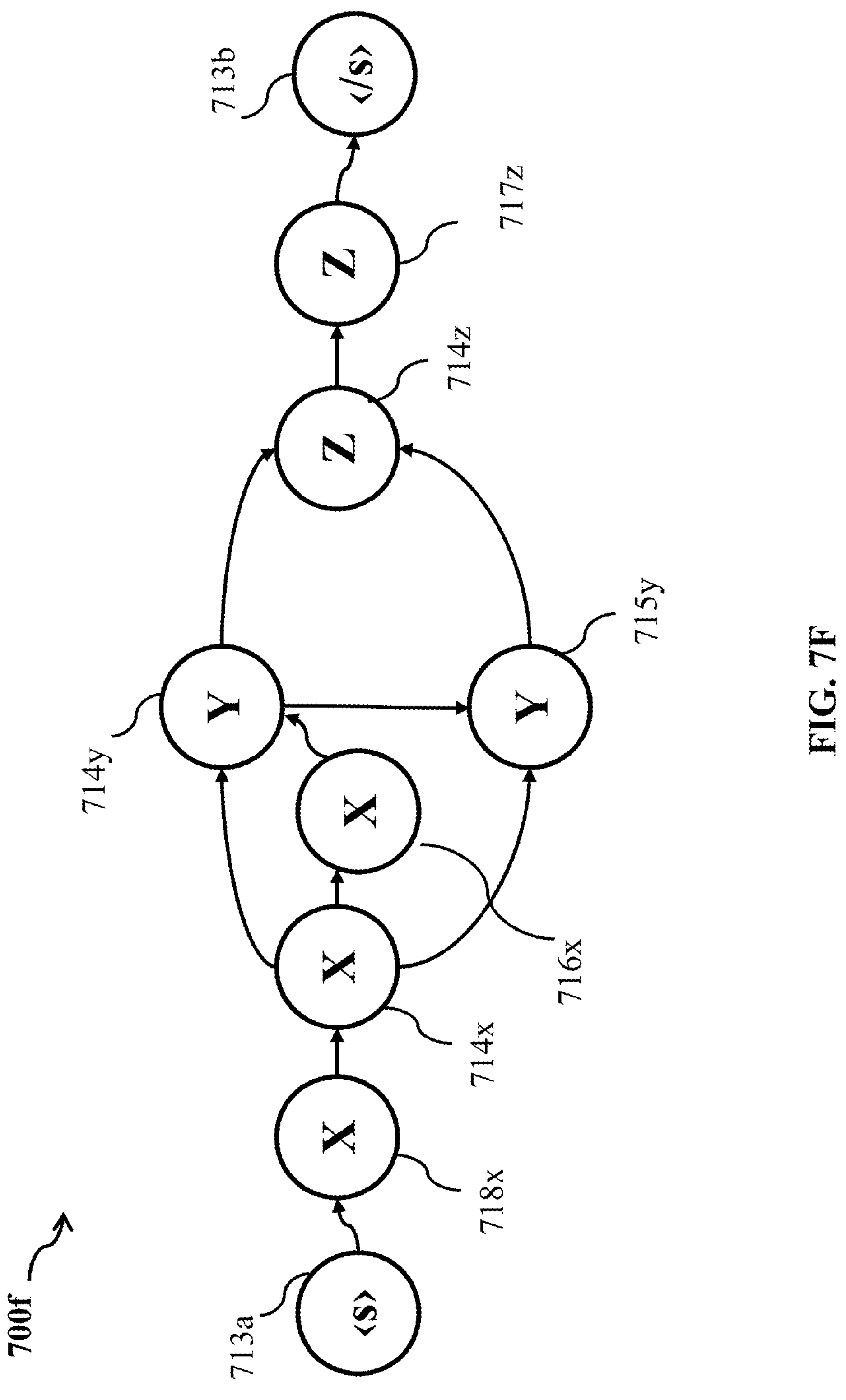
FIG. 7F illustrates a monotonic directed graph modified based on the constraints on label repetitions, in accordance with an example embodiment.

FIG. 7F illustrates another exemplary directed graph 700*f* with a constraint 706*b* on a label repetition, in accordance with an example embodiment. In FIG. 7F, the structure of the monotonic directed graph 700*f* constraints that label "X" can be repeated only thrice in a sequence to that end a node 716*x* representing label "X" and node 718*x* also representing label "X" may be connected to the original node 714*x*. In this example, a sequence of connected nodes representing the same label is formed by nodes 714*x* and 716*x*, and 718*x*.

In a similar manner, the label "Z" may be constrained to be always repeated twice, and so on. To that end, node 717*z* may be connected to the original node 714*z*. In this, way the directed graph 700*f* provides great flexibility to optimize the training of the neural network 701.

The constraint 706*b* on repetition is advantageous for speech-related applications. For example, for a directed graph 700*f* to be used by a neural network 701 corresponding to an ASR system configured to transcribe in English language, it may be known in advance that an output corresponding to label "U" is unlikely to be observed over multiple consecutive frames. Hence, label "U" may be constrained to be repeated only a limited number of times in order to reduce computational complexity and to speed up the computation of the GTC objective.

The advantage of the constraint 706*b* on repetition is not limited to speech-related applications. For example, a directed graph 700*f* and a neural network 701 can correspond to an acoustic event detection system implemented to detect acoustic events in a home environment. A short event like a "door slam" may not be likely to occur over many consecutive observation frames. Therefore, the structure of the directed graph 700*f* may define the constraint 706*b* on the repetition of the label "door slam".

Training With GTC Objective Using the Directed Graph

In various embodiments, the neural network 701 trained based on the GTC objective function 702 to transform the sequence of observations 705 into the sequence of probability distributions 703. Further, the neural network 701 is configured to unfold the directed graph 704 to generate all possible sequences of labels from the multiple sequences of labels 706*a* such that length of the sequence of labels matches the length of the sequence of probability distributions 703. Unfolding the directed graph 704 includes generating the sequence of labels and alignment paths according to the structure of the directed graph 704 by finding paths from a start node to an end node through the nodes and edges of the directed graph 704 of the length of the sequence of probability distributions 703. Each path in the unfolded graph corresponds to a sequence of nodes and edges of fixed length starting at a particular start node and ending at a particular end node. Each possible path in the unfolded graph corresponding to a sequence of nodes and edges can be mapped to a sequence of labels.

Further, the neural network 701 updates one or more parameters of the neural network 701 based on the GTC objective function 702 that is configured to maximize a sum of conditional probabilities of all the possible sequences of labels 706*a* generated by unfolding the directed graph 704. The one or more parameters of the neural network 701 updated by the neural network 701 may comprise the neural network weights and biases as well as other trainable parameters such as embedding vectors, and the likes.

In some embodiments, the directed graph 704 is a weighted graph with at least some edges associated with different weights. Further, the GTC objective function 702 is configured to learn a temporal alignment and a label alignment to obtain an optimal pseudo-label sequence from the weighted directed graph 704 such that the training of the neural network 701 using the GTC function 702 updates the neural network 701 to reduce a loss with respect to the optimal pseudo-label sequence. The neural network 701 trained using the GTC objective function 702 transforms the sequence of observations 705 into the sequence of probability distributions 703 over all possible labels at each instance of time. Further, the trained neural network 701 maximizes the probability of a sequence of labels, at the output of the neural network 701, that is corresponding to a sequence of nodes and edges present in the directed graph 704.

Thus, the GTC objective function 702 makes it possible for the neural network 701 to learn and update parameters of the neural network 701 with label information in a graph format.

The directed graph 704 provides the supervisory information that is used by the GTC objective function 702 in training the neural network 701. In the directed graph 704, a sequence of labels is represented by multiple nodes and edges. Further, the directed graph 704 may comprise a non-monotonic alignment between the sequence of probability distributions 703 and the multiple sequences of labels 706*a* represented by the directed graph 704. The non-monotonic alignment or monotonic alignment is defined as the number of label sequences that can be generated from the directed graph 704 by transitioning from a specific start node to a specific end node after removing label repetitions and the blank labels. The non-monotonic alignment allows the directed graph 704 to output multiple unique label sequences, while a monotonic graph would only allow to output a single label sequence.

Because of the non-monotonic alignment feature, the directed graph 704 comprises information associated not only with variation of sequences of labels in time domain but also with variation of the sequences of labels in label domain, itself. Due to the variation of the sequences of label in the label domain, the directed graph 704 comprises multiple paths through the multiple nodes and edges of the directed graph 704, where each path corresponds to at least one sequence of labels of the multiple sequences of labels 706*a*. Thus, each edge in the directed graph 704 has a direction from one node towards another.

Thus, the non-alignment feature allows the directed graph 704 to consider different sequences of labels during the training, which allows training of the neural network 701 with ambiguous label information in order to account for uncertainties about the correct transcription of a training sample.

Further, the directed graph 704 allows repetition of at least one label of the sequence of labels for the specific minimum number of times and the specific maximum number of times during unfolding of the directed graph 704 in order to reduce the number of possible label paths that can be generated from the unfolded graph and to speed up the computation of the GTC loss.

In some embodiments, the non-monotonic directed graph 704 is a weighted graph with at least some edges associated with different weights. Further, based on the weights of the corresponding edges in the directed graph 704, conditional probabilities of the sequence of nodes may be computed during training.

For ease of explanation, the GTC objective function is explained here with respect to a neural network corresponding to an ASR system. Consider a feature sequence X of length T' derived from a speech utterance, processed by the neural network 701 to output a posterior distribution sequence $Y=(y^1, \ldots, y^T)$ of length T potentially different from T' due to downsampling, where $y^t$ denotes the vector of posterior probabilities and $$y_k^t$$

the posterior probability for output symbol k at time t. For GTC, the label information for training is represented by the graph $\mathcal{G}$, where the graph $\mathcal{G}$ corresponds to the directed graph 704. The GTC objective function 702 marginalizes over all possible node sequences that can be obtained from graph $\mathcal{G}$, which includes all valid node patterns as well as all valid temporal alignment paths. Thus, the conditional probability for a given graph $\mathcal{G}$ is defined by the sum over all node sequences in $\mathcal{G}$, which can be written as:

$$p(\mathcal{G}|X)=\sum_{\pi\in\mathcal{S}(\mathcal{G},T)}p(\pi|X) \tag{1}$$

where, $\mathcal{S}$ represents a search function that unfolds $\mathcal{G}$ to all possible node sequences of length T (not counting non-emitting start and end nodes), π denotes a single node sequence and alignment path, and p(π|X) is the posterior probability for the path π given feature sequence X. The posterior probability is used to compute conditional probability for the path π. The computation of the conditional probability is explained in detail later.

Let's introduce a few more notations that will be useful to derive $p(\mathcal{G}|X)$. The nodes of the graph $\mathcal{G}$ are indexed using g=0, . . . , G+1, sorting them in a breadth-first search manner from 0 (non-emitting start node) to G+1 (non-emitting end node). Further, output symbol observed at node g is denoted by l(g), and the transition weight on edge (g, g') (which connects node g with node g') is denoted by $W_{(g,g')}$. Finally, the node sub-sequence of π from time index t to t' is denoted by $\pi_{t:t'}=(\pi_t, \ldots, \pi_{t'})$. Further, $\pi_0$ and $\pi_{T+1}$ correspond to the non-emitting start and end nodes 0 and G+1.

In order to compute the conditional probabilities $p(\mathcal{G}|X)$ for a given graph $\mathcal{G}$ efficiently, a forward variable α and a backward variable β are computed and the conditional probability $p(\mathcal{G}|X)$ is calculated based on α and β. To that end, the GTC computes a forward probability (or forward variable) for g=1, . . . , G using $$\alpha_t(g)=\sum_{\substack{\pi\in\mathcal{S}(\mathcal{G},T):\\ \pi_{0:t}\in\mathcal{S}(\mathcal{G}_{0:g},t)}}\prod_{\tau=1}^{t}W_{(\pi_{\tau-1},\pi_\tau)}y^{\tau}_{l(\pi_\tau)}, \tag{2}$$

where $\mathcal{G}_{0:g}$ denotes the sub-graph of $\mathcal{G}$ starting at node 0 and terminating at node g. The sum is taken over all possible π whose sub-sequence up to time index t can be generated in t steps from the sub-graph $\mathcal{G}_{0:g}$. Further, a backward variable β is computed similarly for g=1, . . . , G using $$\beta_t(g)=\sum_{\substack{\pi\in\mathcal{S}(\mathcal{G},T):\\ \pi_{t:T+1}\in\mathcal{S}(\mathcal{G}_{g:G+1},T-t+1)}}\prod_{\tau=t}^{T}W_{(\pi_\tau,\pi_{\tau+1})}y^{\tau}_{l(\pi_\tau)}, \tag{3}$$

where $\mathcal{G}_{g:G+1}$ denotes the sub-graph of $\mathcal{G}$ starting at node g and terminating at node G+1. By using the forward and backward variables, the probability function $p(\mathcal{G}|X)$ can be computed for any t by summing over all g:

$$p(\mathcal{G}|X)=\sum_{g\in\mathcal{G}}\frac{\alpha_t(g)\beta_t(g)}{y^t_{l(g)}} \tag{4}$$

For gradient descent training, the loss function $$\mathcal{L}=-\ln p(\mathcal{G}|X) \tag{5}$$

must be differentiated with respect to the network outputs, which can be written as:

$$-\frac{\partial\ \ln\ p(\mathcal{G}|X)}{\partial y_k^t}=-\frac{1}{p(\mathcal{G}|X)}\frac{\partial\, p(\mathcal{G}|X)}{\partial y_k^t} \tag{6}$$

for any symbol $k\in\mathcal{U}$ where $\mathcal{U}$ denotes a set of all possible output symbols or labels.

Because $$\alpha_t(g)\beta_t(g)/y^t_l(g)$$

is proportional to $$y^t_{l(g)}$$

$$\frac{\partial\left(a_t(g)\beta_t(g)/y^t_{l(g)}\right)}{\partial y^t_{l(g)}} = \frac{\alpha_t(g)\beta_t(g)}{y^{t^2}_{l(g)}}, \tag{7}$$

and from (4), following can be derived $$\frac{\partial p(\mathcal{G}|X)}{\partial y^t_k} = \frac{1}{y^{t^2}_k}\sum\nolimits_{g\in\psi(\mathcal{G},k)}\alpha_t(g)\beta_t(g), \tag{8}$$

where $\Psi(\mathcal{G},k)=\{g\in\mathcal{G}:l(g)=k\}$ denotes the set of nodes in $\mathcal{G}$ at which symbol k is observed.

To backpropagate the gradients through the softmax function, a derivative with respect to the unnormalized network outputs $$u^t_k$$

is needed before softmax is applied, which is $$-\frac{\partial\ \ln\ p(\mathcal{G}|X)}{\partial u^t_k} = -\sum\nolimits_{k'\in\mathcal{U}}\frac{\partial\ \ln\ p(\mathcal{G}|X)}{\partial y^t_{k'}}\frac{\partial y^t_{k'}}{\partial u^t_k} \tag{9}$$

By substituting (8) and the derivative of the softmax function $$\frac{\partial y^t_{k'}}{\partial u^t_k} = y^t_{k'}\delta_{kk'} - y^t_{k'}y^t_k \text{ into,} \tag{9}$$

equation (10) is obtained $$-\frac{\partial\ \ln\ p(\mathcal{G}|X)}{\partial u^t_k} = y^t_k - \frac{1}{y^t_k p(\mathcal{G}|X)}\sum\nolimits_{g\in\psi(\mathcal{G},k)}\alpha_t(g)\beta_t(g), \tag{10}$$

where the fact that $$\sum_{k'\in\mathcal{U}}\frac{1}{y^t_{k'}}\sum_{g\in\psi(\mathcal{G},k')}\alpha_t(g)\beta_t(g), = \sum_{k'\in\mathcal{U}}\sum_{g\in\psi(\mathcal{G},k')}\frac{\alpha_t(g)\beta_t(g)}{y^t_{l(g)}} = \sum\nolimits_{g\in\mathcal{G}}\frac{\alpha_t(g)\beta_t(g)}{y^t_{l(g)}} = p(\mathcal{G}|X), \tag{11}$$

and that $$\sum\nolimits_{k'\in\mathcal{U}}\frac{\partial\ \ln\ p(\mathcal{G}|X)}{\partial y^t_{k'}}y^t_{k'}y^t_k = \frac{1}{p(\mathcal{G}|X)}p(\mathcal{G}|X)y^t_k = y^t_k, \tag{12}$$

is used.

The GTC objective function 702 learns temporal and label alignments from the supervisory information of the directed graph $\mathcal{G}$, and the GTC objective function 702 is used to train the neural network 701. The training is explained below with respect to FIG. 8.

The neural network 701 is trained using the GTC objective function 702 that enables the neural network 801 to resolve temporal alignment or temporal ambiguity as well as label alignment or label ambiguity in order to learn the optimal alignment between the sequence of probability distributions 703 and the sequences of labels represented by the directed graph 704.

Figure 8:
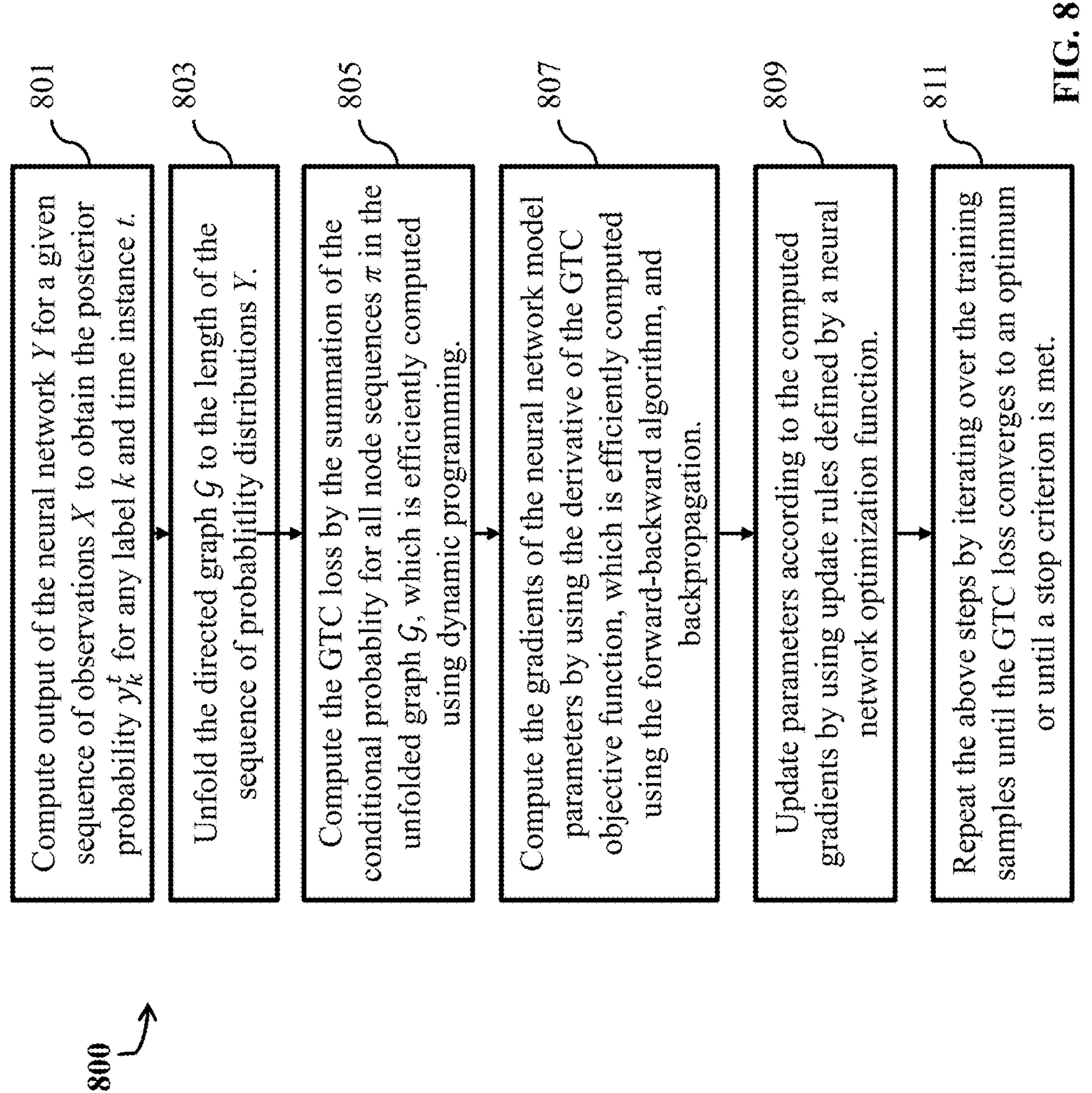
FIG. 8 illustrates steps of a method for training the neural network using the GTC objective function, in accordance with an example embodiment.

FIG. 8 illustrates steps of a method 800 for training the neural network 701 using the GTC objective function 702, in accordance with an example embodiment. FIG. 8 is explained in conjunction with FIG. 7A. In FIG. 8, at step 801, an output of the neural network 701 for the given sequence of observation X is computed to obtain the posterior probability for any output symbol k at time t denoted by $$y^t_k.$$

At step 803, the directed graph $\mathcal{G}$ may be unfolded to the length of the sequence of probability distributions Y. While unfolding the directed graph $\mathcal{G}$, labels represented by the nodes and edges of graph $\mathcal{G}$ may get repeated in order to match a length of a sequence of labels to the corresponding length of the sequence of probability distributions Y.

At step 805, a GTC loss function as shown in equation (5) is computed by taking summation of the conditional probability for all node sequences $\pi$ in the unfolded graph $\mathcal{G}$. The summation is efficiently computed using dynamic programming.

At step 807, gradients of the neural network parameters are computed using the derivative of the GTC objective function 702 with respect to all possible output symbols as shown in equations (10) and (4) above, which is efficiently computed using the forward-backward algorithm and back propagation. To that end, the forward-backward algorithm determines the forward variable $\alpha$ and the backward variable $\beta$, where $\alpha$ and $\beta$ are used to determine $p(\mathcal{G}|X)$ expressed mathematically in equation (12).

At step 809, parameters of the neural network 701 may be updated according to the gradient computed in step 807. To update the parameters, a neural network optimization function may be implemented that defines rules to update the parameters of the neural network 701. The neural network optimization function may comprise at least one of: Stochastic Gradient Decent (SGD), SGD with momentum, Adam, AdaGrad, AdaDelta, and the likes.

At step 811, it may be determined whether to repeat steps 801 through 809 by iterating over the training samples (i.e., pairs of a sequence of observations and a graph $\mathcal{G}$) or over batches of the training samples based on at least one of: the GTC loss converges to an optimum or a stop criterion is met.

Some embodiments are based on the realization that the GTC objective function 702 described above needs to be extended to the GTC-e 402 objective function, to be able to apply it to the trained neural network 501, which operated in multi-speaker condition. In the GTC objective function 702, only the posteriors on nodes were predicted by the neural network 701. However, in the GTC-e 402 objective function, even the weights on the edges of a directed graph such as the graph 602 are predicted by the neural network 501. To that end, it was already discussed that in the graph 602, nodes indicate tokens or labels, and edges indicate speaker transitions. To that end, in the extended GTC formulation, there are two transition weights on edges (g, g') (which connects node g with node g'). First is a deterministic transition weight denoted by $W_{(g,g')}$ which is already described while discussion of GTC objective function 702 above, and in addition, there is a predicted transition weight by the neural network 501, which is denoted as $$\omega^t_{I(g,g')}.$$

The predicted transition weight $$\omega^t_{I(g,g')}$$

in the GTC-e 402 objective function is an additional posterior probability distribution, representing a transition weight on edge (g, g') at time t, where I(g, g')∈I and I is the index set of all possible transitions. The posterior probabilities are obtained as the output of a softmax.

Further, in the GTC-e 402 objective function, the forward probability $\alpha_t(g)$ defined in Eq. (2) is modified as:

$$\alpha_t(g) = \sum_{\substack{\pi \in \mathcal{S}(\mathcal{G},T): \\ \pi_{0:t} \in \mathcal{S}(\mathcal{G}_{0:g},t)}} \prod_{\tau=1}^{t} W_{(\pi_{\tau-1},\pi_\tau)} \omega^\tau_{I(\pi_{\tau-1},\pi_\tau)} y^\tau_{l(\pi_\tau)}, \tag{2a}$$

Where $\alpha_t$t (g) represents the total probability at time t of the sub-graph $\mathcal{G}_{0:g}$ of $\mathcal{G}$ containing all paths from node 0 and terminating at node g. It can be computed for g=1, . . . , G. Further, $\alpha_0(g)$ equals 1 if g corresponds to the start node and it equals 0 otherwise.

Further, in the GTC-e formulation, the backward probability $\beta_t(g)$ defined in Eq. (3) is modified as:

$$\beta_t(g) = \sum_{\substack{\pi \in \mathcal{S}(\mathcal{G},T): \\ \pi_{t:T+1} \in \mathcal{S}(\mathcal{G}_{g:G+1},T-t+1)}} y^\tau_{l(\pi_\tau)} \prod_{\tau=t}^{T-1} W_{(\pi_\tau,\pi_{\tau+1})} \omega^{\tau+1}_{I(\pi_\tau,\pi_\tau+1)} y^\tau_{l(\pi_\tau)}, \tag{3a}$$

Where $\mathcal{G}_{g:G+1}$ denotes the sub-graph of $\mathcal{G}$ containing all paths from node g and terminating at node G+1 Similar to GTC, the computation of α and β can be efficiently performed using the forward-backward algorithm.

The neural network 501 is optimized by gradient descent. The gradients of the loss with respect to the label posteriors $$y^t_k$$

corresponding unnormalized network outputs $$u^t_k$$

before the softmax is applied, for any symbol $k \in \mathcal{U}$, can be obtained in the same way as in CTC and GTC, where the key idea is to express the probability function p($\mathcal{G}$ |X) at t using the forward and backward variables as given in Eq. (4):

$$p(\mathcal{G}|X) = \sum_{g \in \mathcal{G}} \frac{\alpha_t(g)\beta_t(g)}{y^t_{l(g)}}$$

The derivation of the gradient of the loss with respect to the network outputs for the transition probabilities $$\omega^t_i$$

for a transition i∈I is similar but with some important differences. Here, the key is to express p($\mathcal{G}$ |X) at t as:

$$p(\mathcal{G} \mid X) = \sum_{(g,g') \in \mathcal{G}} \alpha_{t-1}(g) W_{(\pi_\tau,\pi_{\tau+1})} \omega^{\tau+1}_{I(\pi_\tau,\pi_\tau+1)} \beta_{t-1}(g') \tag{13}$$

The derivative of p($\mathcal{G}$ |X) with respect to the transition probabilities $$\omega^t_i$$

can then be written as:

$$\frac{\partial p(\mathcal{G}|X)}{\partial \omega^t_i} = \sum_{(g,g') \in \Phi(\mathcal{G},i)} \alpha_{t-1}(g) W_{(g,g')} \omega^t_{I(g,g')} \beta_{t-1}(g') \tag{14}$$

where Φ($\mathcal{G}$ , i)={(g, g')∈$\mathcal{G}$ :l (g, g')=i} denotes the set of edges in $\mathcal{G}$ that correspond to transition i.

To backpropagate the gradients through the softmax function of $$\omega^t_i,$$

a derivative with respect to the unnormalized network outputs $$h^t_i$$

is needed before softmax is applied, which is $$-\frac{\partial \ln p(\mathcal{G} \mid X)}{\partial h^t_i} = -\sum_{i' \in I} \frac{\partial \ln p(\mathcal{G} \mid X)}{\partial \omega^t_{i'}} \frac{\partial \omega^t_{i'}}{\partial h^t_i} \tag{15}$$

The gradients for the transition weights are derived by substituting (14) and the derivative of the softmax function $$\frac{\partial \omega_{i'}^t}{\partial h_i^t} = \omega_{i'}^t \delta_{ii'} - \omega_{i'}^t \omega_k^t$$

into (15):

(10)

$$-\frac{\partial \ln p(\mathcal{G} \mid X)}{\partial h_i^t} = \omega_i^t - \frac{\omega_i^t}{p(\mathcal{G} \mid X)} \sum\nolimits_{(g,g') \in \Phi(\mathcal{G},i)} \alpha_{t-1}(g) W_{(g,g')} \beta_t(g'). \tag{16}$$

The fact used was:

$$-\sum_{i' \in I} \frac{\partial \ln p(\mathcal{G} \mid X)}{\partial \omega_{i'}^t} \omega_{i'}^t \delta_{ii'} = -\frac{\partial \ln p(\mathcal{G} \mid X)}{\partial \omega_i^t} \omega_i^t = -\frac{\omega_i^t}{p(\mathcal{G} \mid X)} \sum\nolimits_{(g,g') \in \Phi(\mathcal{G},i)} \alpha_{t-1}(g) W_{(g,g')} \beta_t(g').$$

And that $$\sum_{i' \in I} \frac{\partial \ln p(\mathcal{G} \mid X)}{\partial \omega_{i'}^t} \omega_{i'}^t \omega_i^t = \sum_{i' \in I} \frac{\omega_{i'}^t \omega_i^t}{p(\mathcal{G} \mid X)} \sum_{(g,g') \in \Phi(\mathcal{G},i)} \alpha_{t-1}(g) W_{(g,g')} \beta_t(g'), = \frac{\omega_i^t}{p(\mathcal{G} \mid X)} \sum\nolimits_{i' \in I} \sum\nolimits_{(g,g') \in \Phi(\mathcal{G},i)} \alpha_{t-1}(g) W_{(g,g')} \beta_t(g'), = \frac{\omega_i^t}{p(\mathcal{G} \mid X)} \sum\nolimits_{(g,g') \in \mathcal{G}} \alpha_{t-1}(g) W_{(g,g')} \omega_{I(g,g')}^t \beta_t(g'), = \frac{\omega_i^t}{p(\mathcal{G} \mid X)} p(\mathcal{G} \mid X) = \omega_i^t$$

Thus, using the GTC-e 402 formulation above, the neural network 501 is used to perform speech recognition and speaker separation tasks. Specifically, the neural network 501 may use different decoders that can perform the time alignment of the sequence of likelihoods (or probabilities) of transcription outputs of label or speech recognition and the sequence of likelihoods of identities of the speakers. For example, one embodiment extends the principles of suffix beam search to a multi-speaker scenario. It should be noted that the beam search cannot be used in multi-speaker applications employing a speech separation as a pre-processing or post-processing task. However, the introduction of the multi-head encoder allows adapting the suffix beam search to produce the sequence of transcription outputs annotated with the identities of the speakers.

Figure 9:
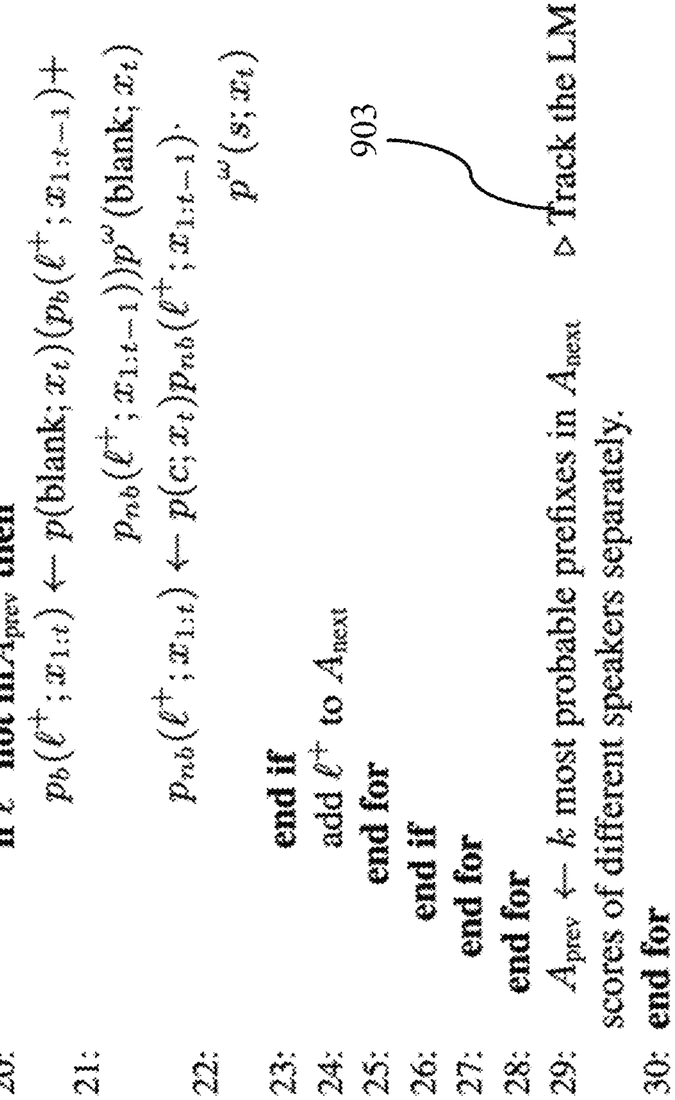
FIG. 9 illustrates a beam search algorithm used during decoding operation of a neural network, in accordance with an example embodiment.

FIG. 9 illustrates a beam search algorithm used during decoding operation of the neural network 501, in accordance with an example embodiment.

Since the output of the GTC-e 402 objective function contains tokens from multiple speakers, the existing time synchronous prefix beam search algorithm is modified as shown in FIG. 9. The main modifications are three fold. First, speaker transition probability 901 is used in the score computation. Second, when expanding the prefixes, all possible speaker IDs are considered 902. to consider all possible speakers. Third, when computing the language model (LM) scores of a prefix, sub-sequences of different speakers are considered separately 903.

These modifications are used by the decoder 202 of the neural network 501 to perform the beam search to produce a sequence of chronologically ordered linguistic tokens where each token is associated with a speaker identity.

In some embodiments, the LM is employed via shallow fusion at inference time, which consists of 2 long short-term memory (LSTM) neural network layers with 1024 units each trained using stochastic gradient descent and the official LM training text data of LibriSpeech, where sentences that occur in the 860 h training data subsets are excluded. ASR decoding is based on a time-synchronous prefix beam search algorithm. A decoding beam size of 30, a score-based pruning threshold of 14.0, an LM weight of 0.8, and an insertion bonus factor of 2.0 are used.

Figure 10:
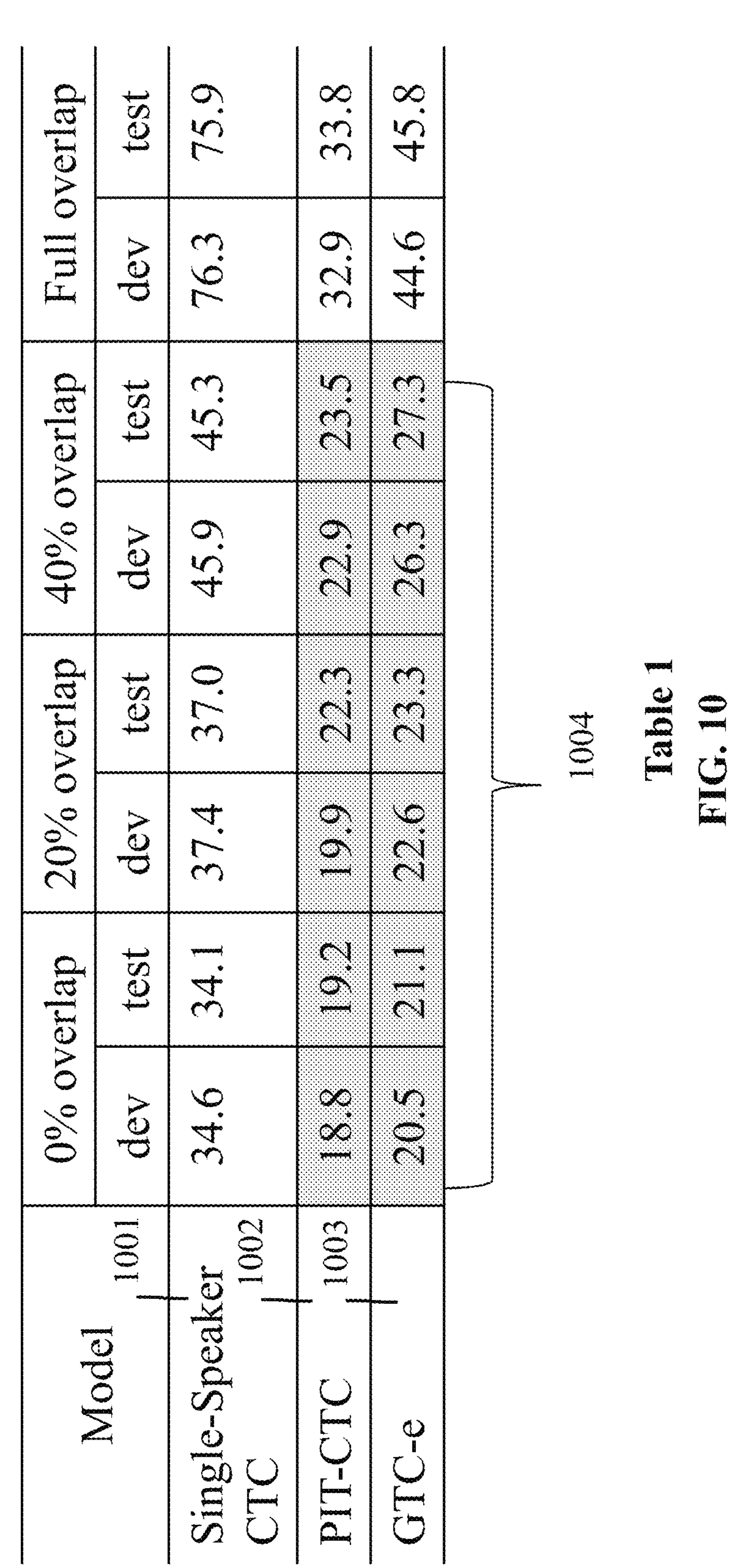
FIG. 10 shows Table 1 that illustrates greedy search results for word error rates (WERs) using GTC-e objective function in comparison with other methods, in accordance with an example embodiment.

FIG. 10 illustrates Table 1 showing greedy search results for ASR performance of the ASR system 104 based on GTC-e 402 objective function.

The word error rates (WERs) are shown in Table 1. From the table, it is observed that the ASR system 104 based on the GTC-e 402 objective function is better than the normal ASR model. The Table 1 shows WERs for three models: a single-speaker CTC model 1001, a PIT-CTC model 1003 and a GTC-e model 1003. The GTC-e model 1003 is the GTC-e 402 based ASR system 104 disclosed in various embodiments described herein. The GTC-e model achieves a performance close to the PIT-CTC model 1003, especially in low-overlap ratio cases (0%, 20%, 40%) 1004.

FIG. 11 illustrates Table 2 showing greedy search results for ASR performance of the ASR system 104 based on GTC-e 402 objective function based on oracle token error rates.

It is shown in Table 2 the oracle TER of PIT-CTC 1002 and GTC-e models 1003, by only comparing the tokens from all output sequences against all reference sequences, regardless of speaker assignment. The averaged test TERs for PIT-CTC 1101 and GTC-e 1102 of 22:8% and 25:0% respectively, from which it is established that the tokens recognition performance is comparable.

The GTC-e 1003 is able to accurately predict the activations of most tokens, which is a very good performance indicator.

FIG. 12 illustrates Table 3 showing beam search results for ASR performance of the ASR system 104 based on GTC-e 402 objective function based on WERs.

For the beam search decoding results of Table 3, for the language model, a 16-layer Transformer-based LM trained on full LibriSpeech data with external. Text was used. The beam size of GTC-e 1003 is set to 40, while that of PIT-CTC 1002 is cut to half to keep the averaged beam size of every speaker the same. With the beam search, the word error rates are greatly improved.

FIG. 13 illustrates Table 4 showing beam search results for ASR performance of the ASR system 104 based on GTC-e 402 objective function based on WERs for multiple speakers. The Table 4 shows rows for WERs for different overlap cases for GTC-e 2-speaker model 1301 (such as the GTC-e 402 objective function of the ASR system 104), a speaker1 1302, and a speaker2 1303.

It is seen from the table that the GTC-e model 1301 is not biased towards any speaker and gives equivalent WERs for each speaker.

Based on the performance results it may be established that the GTC-e 402 objective function is advantageous for multi-speaker separation and speech recognition task, with a good performance. Thus, the GTC-e 402 objective function may be used in various neural network architectures for performing end-to-end ASR.

FIG. 14A illustrates a neural network architecture 1400*a* of an ASR system implemented with the GTC-e 402 objective function, in accordance with an example embodiment.

In some embodiments, the neural network architecture 1400$a$ corresponds to a transducer-based neural network architecture that employs the proposed GTC-T loss function, for training the neural network (e.g. the neural network 501).

In an embodiment, the GTC-T function is explained here with respect to a neural network corresponding to an ASR system. Consider a feature sequence X of length T' derived from a speech utterance, processed by the neural network 501 to produce an output sequence of length T, potentially different from T' due to down-sampling. This output sequence contains a set of posterior probability distributions at every point, since the neural network 501 is conditionally dependent on previous label outputs generated by the ASR system and therefore has different states producing multiple posterior probability distributions for the labels. For example, $v^{t,i}$ denotes the posterior probabilities for neural network state i at time step t and $$v_k^{t,i}$$

denotes the posterior probability of output label k for state i at time t. The GTC-T objective function marginalizes over all possible label alignment sequences that are represented by the graph $\mathcal{G}$. For GTC, the label information for training is represented by the graph $\mathcal{G}$, where the graph $\mathcal{G}$ corresponds to the directed graph 704. Thus, the conditional probability for a given graph $\mathcal{G}$ is defined by the sum over all sequences of nodes in $\mathcal{G}$ of length T, which can be written as:

$$p(\mathcal{G}|X)=\sum_{\pi\in\mathcal{S}(\mathcal{G},T)}p(\pi|X)$$

where, $\mathcal{S}$ represents a search function that expands $\mathcal{G}$ to a lattice of length T (not counting non-emitting start and end nodes), $\pi$ denotes a single node sequence and alignment path, and $p(\pi|X)$ is the posterior probability for the path it given feature sequence X. The posterior probability is used to compute conditional probability for the path$\pi$ given feature sequence X.

The nodes are sorted in a breadth-first search manner and indexed using g=0, . . . , G+1, where 0 corresponds to the non-emitting start node and G+1 to the non-emitting end node. 1(g) denotes the output symbol observed at node g, and by $W_{g,g}$' and $I_{g,g}$' the transition weight and the decoder state index on the edge connecting the nodes g and g'. Finally, $\pi_{t:t'=(\pi_t,\ldots,\pi_{t'})}$ is the node sub-sequence oft from time index t to t'. Note that $t\pi_0$ and $\pi_{T+1}$ correspond to the non-emitting start and end nodes 0 and G+1.

In RNN-T, the conditional probabilities $p(y|X)$ for a given label sequence y are computed efficiently by a dynamic programming algorithm, which is based on computing the forward and backward variables and combining them to compute $p(y|X)$ at any given time t [2]. In a similar fashion, the GTC-T forward probability can be computed for g=1, . . . , G using $$\alpha_t(g)=\sum_{\substack{\pi\in S(\mathcal{G},T)\\ \pi_{0:t}\in S(\mathcal{G}_{0:g},t)}}\prod_{\tau=1}^{t}W_{\pi_{\tau-1},\pi_\tau}v_{l(\pi_\tau)}^{\tau,I(\pi_{\tau-1},\pi_\tau)} \tag{17}$$

where $\mathcal{G}_{0:g}$ denotes the sub-graph of $\mathcal{G}$ containing all paths from node 0 to node g. The sum is taken over all possible $\pi$ whose subsequence up to time index t can be generated in t steps from the sub-graph $\mathcal{G}_{0:g}$. Note that $\alpha_0(g)$ equals 1 if g corresponds to the start node and it equals 0 otherwise. The backward variable $\beta$ is computed similarly for g=1, . . . , G using $$\beta_t(g)=\sum_{\substack{\pi\in S(\mathcal{G},T):\\ \pi_{t:T+1}\in S(\mathcal{G}_{g:G+1},T-t+1)}}\prod_{\tau=t}^{T-1}W_{\pi_\tau,\pi_{\tau+1}}v_{l(\pi_{\tau+1})}^{\tau+1,I(\pi_\tau,\pi_{\tau+1})} \tag{18}$$

where $\mathcal{G}_{g:G+1}$ denotes the sub-graph of G containing all paths from node g to node G+1. From the forward and backward variables at any t, the probability function $p(\mathcal{G}|X)$ can be computed using $$p(\mathcal{G}|X)=\sum_{(g,g')\in\mathcal{G}}\alpha_{t-1}(g)W_{g,g'}v_{l(g')}^{t,I(g,g')}\beta_t(g') \tag{19}$$

For gradient descent training, the loss function $$L=-\ln p(\mathcal{G}|X) \tag{20}$$

must be differentiated with respect to the network outputs, which can be written as $$-\frac{\partial \ln p(\mathcal{G}|X)}{\partial v_k^{t,i}}=-\frac{1}{p(\mathcal{G}|X)}\frac{\partial p(\mathcal{G}|X)}{\partial v_k^{t,i}} \tag{21}$$

for any symbol $k\in U$ and any decoder state $i\in I$, where U denotes a set of all possible output symbols and I a set of all possible decoder state indices. The derivative of $p(\mathcal{G}|X)$ with respect to $$v_k^{t,i}$$

can be written as $$\frac{\partial p(\mathcal{G}|X)}{\partial v_k^{t,i}}=\sum_{(g,g')\in\Phi(\mathcal{G},k,i)}\alpha_{t-1}(g)W_{g,g'}\beta_t(g') \tag{22}$$

where $\emptyset(\mathcal{G},k,i)=\{(g,g')\in\mathcal{G}:1(g')=k\wedge I(g,g')=i\}$ denotes the set of edges in $\mathcal{G}$ that correspond to decoder state i and where label k is observed at node g'. To backpropagate the gradients through the softmax function of $$v_k^{t,i},$$

derivative is needed with respect to the unnormalized network outputs $$h_k^{t,i}$$

before the softmax is applied, which is $$-\frac{\partial \ln p(\mathcal{G}|X)}{\partial h_k^{t,i}}=-\sum_{k'\in U}\frac{\partial \ln p(\mathcal{G}|X)}{\partial v_{k'}^{t,i}}\frac{\partial v_{k'}^{t,i}}{\partial h_k^{t,i}} \tag{23}$$

Finally, the gradients for the neural network outputs are $$-\frac{\partial \ln p(\mathcal{G}\mid X)}{\partial h_k^{t,i}} = \frac{v_k^{t,i}}{p(\mathcal{G}\mid X)}\Big(\sum_{(g,g')\in\Psi(\mathcal{G},i)}\alpha_{t-1}(g)W_{g,g'}v_{l(g')}^{t,i}\beta_t(g') - \sum_{(g,g')\in\Psi(\mathcal{G},i)}\alpha_{t-1}(g)W_{g,g'}\beta_t(g')\Big) \quad (24)$$

where Ψ($\mathcal{G}$, i)={(g, g')∈$\mathcal{G}$ :I(g, g')=i}. Eq. (24) is derived by substituting (22) and the derivative of the softmax function $$\frac{\partial v_{k'}^{t,i}}{\partial h_k^{t,i}} = v_{k'}^{t,i}\delta_{kk'} - v_{k'}^{t,i}v_k^{t,i}$$

into (23) and by using the fact that $$-\sum_{k'\in U}\frac{\partial \ln p(\mathcal{G}\mid X)}{\partial v_{k'}^{t,i}}v_{k'}^{t,i}\delta_{kk'} = -\frac{\partial \ln p(\mathcal{G}\mid X)}{\partial v_k^{t,i}}v_k^{t,i} = -\frac{v_k^{t,i}}{p(\mathcal{G}\mid X)}\sum_{(g,g')\in\phi(\mathcal{G},k,i)}\alpha_{t-1}(g)W_{g,g'}\beta_t(g') \quad (10)$$

and that $$\sum_{k'\in U}\frac{\partial \ln p(\mathcal{G}\mid X)}{\partial v_{k'}^{t,i}}v_{k'}^{t,i}v_k^{t,i} = \sum_{k'\in U}\frac{v_{k'}^{t,i}v_k^{t,i}}{p(\mathcal{G}\mid X)}\sum_{(g,g')\in\phi(\mathcal{G},k',i)}\alpha_{t-1}(g)W_{g,g'}\beta_t(g'), = \frac{v_k^{t,i}}{p(\mathcal{G}\mid X)}\sum_{k'\in U}\sum_{(g,g')\in\phi(\mathcal{G},k',i)}\alpha_{t-1}(g)W_{g,g'}v_{k'}^{t,i}\beta_t(g') = \frac{v_k^{t,i}}{p(\mathcal{G}\mid X)}\sum_{(g,g')\in\phi(\mathcal{G},i)}\alpha_{t-1}(g)W_{g,g'}v_{l(g')}^{t,i}\beta_t(g') \quad (25)$$

FIG. 14A illustrates a neural network architecture 1400*a* the ASR system implemented with the GTC-T objective function.

In some embodiments, the neural network architecture 1400*a* corresponds to a transducer-based neural network architecture that employs the proposed GTC-T loss function 1401 for training the neural network (e.g. the neural network 501 where the GTC-T loss function 1401 corresponds to the GTC-T objective function. In the neural network architecture 1400*a* 80-dimensional log mel spectral energies plus 3 extra features for pitch information as acoustic features are used as an input, where the acoustic features are derived from audio input 1402 using a feature extraction module 1403.

In some embodiments, the neural network architecture 1400*a* consists of a two-layer convolutional neural network (CNN) model 1405 followed by a stack of E=12 transformer-based encoder layers 1406, a linear layer 1407, a prediction network 1408, joiner network 1409, and a softmax function 1410 at the end to map the neural network output to a posterior probability distribution. In some example embodiments, each layer of the 2-layer CNN model 1405 may use a stride of 2, a kernel size of 3×3, 320 channels, and a rectified linear unit (ReLU) activation function. In addition, a linear neural network layer 1407 is applied to the output of the last CNN layer. Sinusoidal positional encodings 1411 are added to the output of the 2-layer CNN model 1405 before feeding it to the transformer-based encoder 1406. Each transformer layer employs 320-dimensional multi-head self-attention layers with 4 attention heads, layer normalization, and a feed-forward neural network module of inner dimension 1540. Residual connections are applied to the multi-head self-attention and the output of the feed-forward module.

In an embodiment, the HKUST and the LibriSpeech ASR benchmark is used for evaluation. The HKUST is a corpus of Mandarin telephone speech recordings with more than 180 hours of transcribed speech data, and LibriSpeech comprises nearly 1 k hours of read English audio books. In an example, the ASR system is configured to first extract 80-dimensional log-mel spectral energies plus 3 extra features for pitch information. The derived feature sequence is processed by a VGG neural network, which down-samples the sequence of features to a frame rate of 40 ms, before being fed into the encoder 1406. The encoder 1406 is composed of 12 Conformer blocks, where each block includes a self-attention layer, a convolution module, and two Macaron-like feed-forward neural network modules. In addition, the input to each component of the Conformer block is layer normalized and dropout is applied to the output of several neural network layers.

Hyperparameters of the encoder 1406 are $d_{model}$=256, d=2048, $d_h$=4, and E=12 for HKUST, while $d_{model}$ and $d_h$ are increased to 512 and 8 respectively for LibriSpeech. For the CTC model, the output of the encoder neural network is projected to the number of output labels (including the blank label) using a linear layer and a softmax function to derive a probability distribution over the labels. For the GTC-T and RNN-T loss types, two additional neural network components are used, the prediction network 1408 and the joiner network 1409. the prediction network 1408 consists of a single long short-term memory (LSTM) neural network and a dropout layer. The prediction network 1408 acts like a language model and receives as an input the previously emitted ASR label (ignoring the blank label). The prediction network 1408 converts the received input of the previously emitted ASR labels into an embedding space. The joiner network 1409 combines the sequence of encoder frames and the neural network output using the linear layer 1407 and a tanh activation function. Further, the softmax 1410 is used to map the neural network output to the posterior probability distribution. Dropout with a probability of 0.1 is used after the multi-head self-attention and after the feed-forward module as well as for the inner dimension of the feed-forward module.

In some embodiments, SpecAugment-based data augmentation is utilized for training. In one specific example, ASR output symbols consist of a blank symbol plus 5000 sub-words obtained by the SentencePiece method, which are generated from the transcripts of the "clean" 100 h LibriSpeech training data subset only. The ASR model is trained using the Adam optimizer with $\beta_1$=0.9, $\beta_2$=0.98, $\epsilon=10^{-9}$, and learning rate scheduling with 25000 warmup steps. The learning rate factor and the maximum number of training epochs are set to 1.0 and 50 for HKUST and to 5.0 and 100 for LibriSpeech.

In some embodiments, a task-specific LSTM-based language model (LM) is trained and employed via shallow fusion during decoding. For HKUST, the LM consists of 2 LSTM layers with 650 units each. For LibriSpeech, 4 LSTM layers with 2048 units each are used instead. For LibriSpeech, the effect of a strong Transformer-based LM (Tr-LM) with 16 layers is also tested. ASR output labels consist of a blank token plus 5,000 subword units obtained for LibriSpeech or of a blank token plus 3,653 character-based symbols for the HKUST task.

FIG. 14B illustrates a pseudo-code 1400*b* for beam search algorithm for GTC-T with a CTC-like graph, in accordance with an example embodiment. In FIG. 14B, l corresponds to a prefix sequence, the prefix probability is separated into $$p^t_{nb}(l) \text{ and } p^t_b(l)$$

for ending with in blank (b) or not ending in blank (nb) at time step t, and θ1 and θ2 are used as thresholds for pruning the set of posterior probabilities locally and for score-based pruning of the set of prefixes/hypotheses. More specifically, function PRUNE ($\Omega_{next}$, $p_{asr}$, P, $\theta_2$) performs two pruning steps. First, the set of hypotheses residing in $\Omega_{next}$ is limited to the P best hypotheses using the ASR scores $p_{asr}$, then any ASR hypothesis whose ASR score is less than log $p_{best}-\theta_2$ is also removed from the set, where $p_{best}$ denotes the best prefix ASR score in the set. The posterior probabilities $v^{t,i}$ are generated by the neural network using $NN_{ET}$(X, l, t), where X represents the input feature sequence, and i denotes the neural network state that depends on prefix l. The posterior probability of ASR label k at time frame t and state i is denoted by $$v^{t,i}_k.$$

Furthermore, α and β are the LM and label insertion bonus weights and |l| denotes the sequence length of prefix l. The Øsymbol represents the blank label and <sos> a start of sentence symbol.

Figure 14C:
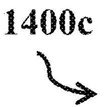
FIG. 14C illustrates comparison of ASR results for CTC, RNN-T, and GTC-T losses on the HKUST benchmark, in accordance with an example embodiment.

FIG. 14C illustrates comparison 1400*c* of ASR results for CTC, RNN-T, and GTC-T losses on the HKUST benchmark, in accordance with an example embodiment.

In FIG. 14C, ASR results for the CTC, RNN-T, and GTC-T losses on the HKUST benchmark are shown. Joint CTC/RNN-T training as well as parameter initialization for GTC-T training via CTC pre-training greatly improves ASR results for both RNN-T as well GTC-T based models. For instance, CTC-based initialization only affects parameters of the encoder 1406, while parameters of the prediction network 1408 and joiner network 1409 remain randomly initialized. The ASR results demonstrate that for GTC-T training the usage of a CTC-like graph performs better compared to a MonoRNN-T graph. In addition, the GTC-T model outperforms the results of the RNN-T model by 0.5% on the HKUST dev test set. While the usage of an LM via shallow fusion did not help to improve word error rates (WERs) significantly for the RNN-T and GTC-T based ASR models, CTC-based ASR results are improved between 0.7% and 1.0%. For HKUST, the CTC system also outperformed both the RNN-T as well as the GTC-T systems.

FIG. 14D illustrates comparison 1400*d* of ASR results for CTC, RNN-T, and GTC-T losses on the LibriSpeech dataset benchmark, in accordance with an example embodiment.

In FIG. 14D, ASR results on the larger LibriSpeech dataset are shown. RNN-T as well as GTC-T outperform CTC results. For example, GTC-T with a CTC-like graph, CTC-based initialization, a Transformer-based LM, and a beam size of 30 for decoding achieves a WERs of 5.9% for the test-other conditions of LibriSpeech. This is 0.9% better compared to the best CTC results despite using a strong LM and a generous beam size. The GTC-T results are also 0.3% better compared to the best RNN-T results. In addition, similar to the HKUST experiments, GTC-T with a CTC-like graph obtains better results than using the MonoRNN-T graph. However, the results of FIG. 14D also demonstrate that parameter initialization of the encoder 1406 is particularly important for GTC-T training, and without initialization the training converges more slowly. For LibriSpeech, the RNN-T model performs better than GTC-T when no external LM is used.

Exemplar Implementations

Figure 15:
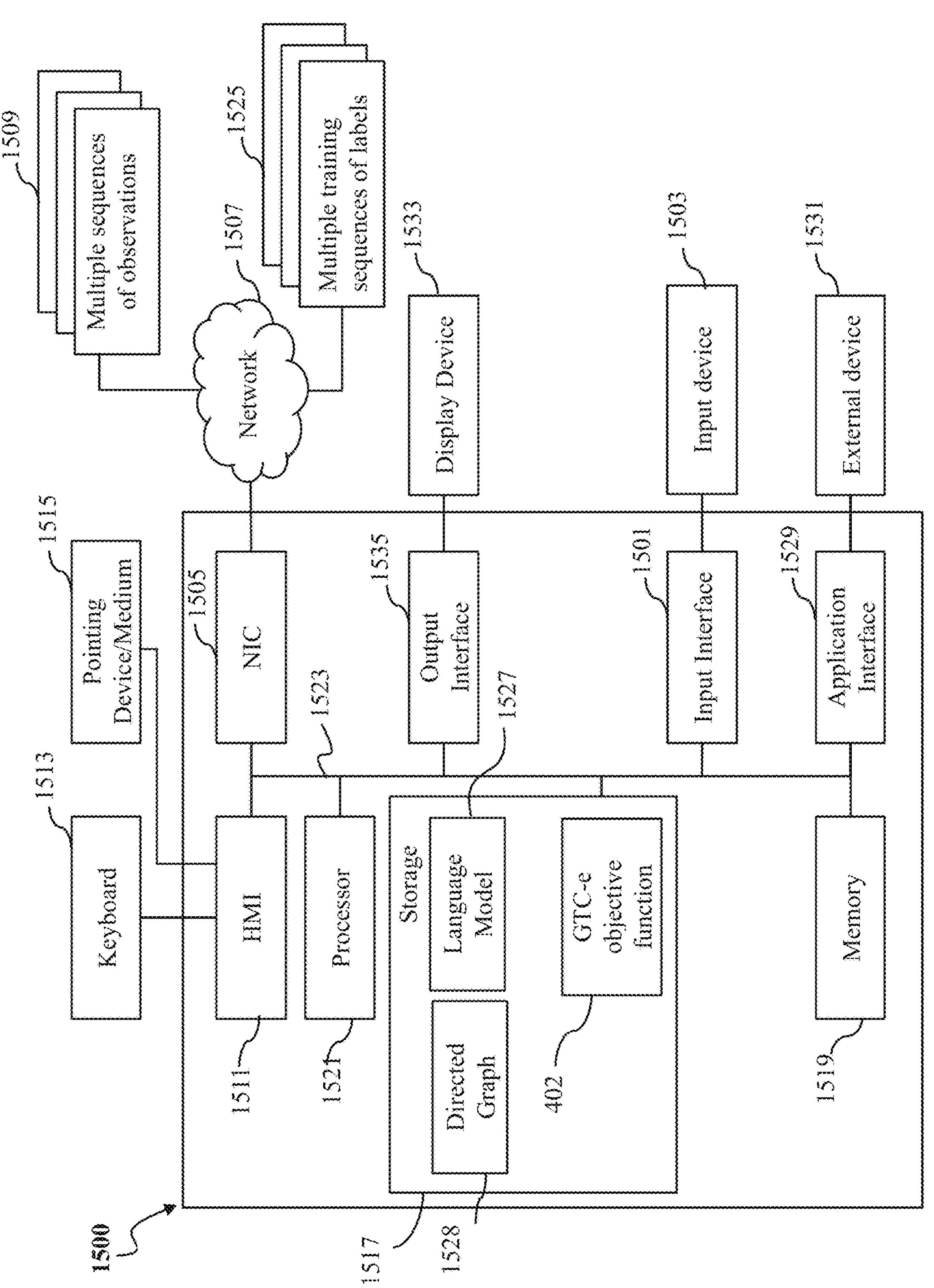
FIG. 15 illustrates a block diagram of a computer-based system trained using the GTC-e objective function, in accordance with an example embodiment.

FIG. 15 illustrates a block diagram of a computer-based system 1500 trained using the GTC-e 402 objective function, in accordance with an example embodiment. The computer-based system 1500 may correspond to the end-to-end ASR system 104, an acoustic event detection system, or the likes.

The computer-based system 1500 includes a number of interfaces connecting the system 1500 with other systems and devices. The system 1500 includes an input interface 1501 configured to accept multiple sequences of observations 1509 such as a stream of acoustic frames representing features of a speech utterance. Additionally or alternatively, the computer-based system 1500 can receive multiple sequences of observations from various other types of input interfaces. In some embodiments, the system 1500 includes an audio interface configured to obtain the multiple sequences of observations 1509 (i.e., the stream of acoustic frames) from acoustic input devices 1503. For example, the system 1500 may use the multiple sequences of observations 1509 comprising acoustic frames in the ASR application or acoustic event detection applications.

The input interface 1501 is further configured to obtain multiple training sequences of labels 1525 for each sequence of observations of the multiple sequences of observations 1509, where there is no temporal alignment between the multiple training sequences of labels 1525 and a sequence of probability distributions outputted by a neural network corresponding to a sequence of observations inputted to the neural network.

In some embodiments, the input interface 1501 includes a network interface controller (NIC) 1505 configured to obtain the multiple sequences of observations 1509 and the multiple training sequences of labels 1525, via network 1507, which can be one or a combination of a wired and a wireless network.

The network interface controller (NIC) 1505 is adapted to connect the system 1500 through a bus 1523 to the network 1507 connecting the system 1500 with sensing devices, for example, input device 1503. Additionally or alternatively, system 1500 can include a human-machine interface (HMI) 1511. The human-machine interface 1511 within the system 1500 connects the system 1500 to a keyboard 1513 and pointing device 1515, wherein the pointing device 1515 can include a mouse, trackball, touchpad, joystick, pointing stick, stylus, or touchscreen, among others.

The system 1500 includes a processor 1521 configured to execute stored instructions 1517, as well as a memory 1519 that stores instructions that are executable by the processor 1521. The processor 1521 can be a single core processor, a multi-core processor, a computing cluster, or any number of other configurations. The memory 1519 can include random access memory (RAM), read-only memory (ROM), flash memory, or any other suitable memory systems. The processor 1521 can be connected through the bus 1523 to one or more input and output devices.

Instructions 1517 can implement a method for training a neural network associated with the system 1500 using the GTC-e 402 objective function. System 1500 may be used to implement various applications of the neural network such as end-to-end speech recognition, acoustic event detection, image recognition, and the likes, according to some embodiments. To that end, the computer memory 1519 stores the directed graph 1528, a language model 1527, and the GTC-e 402 objective function. In order to train the system 1500 using the GTC-e 402 objective function, a directed graph 1528 comprises multiple nodes connected with edges, where each node represents a label and each edge represents a speaker ID.

Further, a path through a sequence of nodes and edges of the directed graph 1528 representing a training sequence of labels is generated, where there are multiple paths.

In some embodiments, the directed graph 1528 is a weighted graph of the nodes weighted with associated scores corresponding to probabilities of a transcription output of a node being a true transcription output at an instance of time. In some embodiments, a transition from one node to another is weighted, where the weights may be estimated from scores of a strong language model (LM) 1527. The directed graph 107 is used by the GTC-e 402 objective function, where the GTC-e 402 objective function is used to train the system 1500 to transform each sequence of observations of the multiple sequences of observations 1509 into a sequence of probability distributions over all possible labels at each instance of time by maximizing a probability of a sequence of labels, at the output of the system 1500, corresponding to a sequence of nodes and edges that are comprised by the directed graph 1528, where the system 1500 comprises an output interface 1535 configured to output the sequence of labels and edges and their likelihoods in terms of probability distributions.

In some embodiments, the output interface 1539 may output each probability of the sequence of probability distribution corresponding to each label at each time stamp on a display device 1533. The sequence of probability distribution may be displayed as a matrix. Examples of a display device 1533 include a computer monitor, television, projector, or mobile device, among others. The system 1500 can also be connected to an application interface 1529 adapted to connect the system 1500 to an external device 1531 for performing various tasks such as sound event detection.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other units suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, or any other kind of central processing unit. Generally, a central processing unit will receive instructions and data from a read-only memory or a random access memory, or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An end-to-end automatic speech recognition (ASR) system, comprising: a processor; and a memory having instructions stored thereon, wherein the processor is configured to execute the stored instructions to cause the ASR system to:

collect a sequence of acoustic frames providing a digital representation of an acoustic signal including a mixture of speeches performed by multiple speakers;

encode each frame from the sequence of acoustic frames with a multi-head encoder encoding each frame into a likelihood of a transcription output and a likelihood of an identity of a speaker to produce a sequence of likelihoods of transcription outputs and a sequence of likelihoods of identities of the speakers corresponding to the sequence of acoustic frames;

decode the sequence of likelihoods of transcription outputs and the sequence of likelihoods of identities of the speakers with a decoder performing an alignment producing a sequence of transcription outputs annotated with identities of the speakers, wherein the multi-head encoder and the decoder form at least a part of a neural network trained with an extended connectionist temporal classification (CTC) objective function to enforce an alignment between an input of the neural network and an output of the neural network on a graph with nodes indicative of transcription outputs and edges indicative of speaker transitions; and submit the sequence of transcription outputs annotated with the identities of the speakers into a downstream application.

2. The ASR system of claim 1, wherein the decoder uses a beam search to produce a sequence of chronologically ordered linguistic tokens where each token is associated with a speaker identity.

3. The ASR system of claim 2, wherein the beam search is configured to perform an operation including one or a combination of (1) generating a speaker transition probability and a linguistic token probability, (2) computing a score of a linguistic token, (3) expanding a list of prefixes of all speakers from a set of possible speakers, and (4) computing a score of a prefix by considering separately sub-sequences of different speakers.

4. The ASR system of claim 1, wherein the encoder comprises an acoustic encoder configured to process the acoustic signal and generate a sequence of encoder states, and the decoder comprises an attention-based decoder.

5. The ASR system of claim 1, wherein the neural network is trained to achieve multiple objectives by minimizing a loss function including a first component associated with an error in speech recognition and a second component associated with an error in speaker identification.

6. The ASR system of claim 1, wherein the extended CTC objective function is an extended graph based temporal classification (GTC-e) objective function, wherein the GTC-e objective function uses supervisory information from a directed graph of nodes connected by edges representing labels and transitions among the labels, wherein the directed graph represents possible alignment paths for a sequence of probability distributions outputted by the neural network and the labels.

7. The ASR system of claim 6, wherein the directed graph represents multiple possible alignment paths for the sequence of probability distributions and a sequence of the labels such that possible passes through a structure of the directed graph allows multiple unique label sequences, which are obtained after collapsing label repetitions and removing blank labels from the multiple unique label sequences, thereby resulting in a non-monotonic alignment between the sequence of the labels and the sequence of probability distributions.

8. The ASR system of claim 7, wherein the non-monotonic alignment is encoded in the structure of the directed graph by allowing transitions from one label to multiple other non-blank labels, by allowing transitions from one label to multiple other blank labels, or both.

9. The ASR system of claim 1, wherein the extended CTC objective function is a graph based temporal classification-transducer (GTC-T) objective function.

10. The ASR system of claim 1, wherein the nodes of the directed graph are indicative of tokens from all speakers in a chronological order.

11. The ASR system of claim 1, wherein the edges of the directed graph are indicative of speaker identification information.

12. A computer-implemented method for end-to-end automatic speech recognition (ASR), comprising:

collecting a sequence of acoustic frames providing a digital representation of an acoustic signal including a mixture of speeches performed by multiple speakers;

encoding each frame from the sequence of acoustic frames with a multi-head encoder encoding each frame into a likelihood of a transcription output and a likelihood of an identity of a speaker to produce a sequence of likelihoods of transcription outputs and a sequence of likelihoods of identities of the speakers corresponding to the sequence of acoustic frames;

decoding the sequence of likelihoods of transcription outputs and the sequence of likelihoods of identities of the speakers with a decoder performing an alignment producing a sequence of transcription outputs annotated with identities of the speakers, wherein the multi-head encoder and the decoder form at least a part of a neural network trained with an extended connectionist temporal classification (CTC) objective function to enforce an alignment between an input of the neural network and an output of the neural network on a graph with nodes indicative of transcription outputs and edges indicative of speaker transitions; and submitting the sequence of transcription outputs annotated with the identities of the speakers into a downstream application.

13. The method of claim 12, wherein the decoder uses a beam search to produce a sequence of chronologically ordered linguistic tokens where each token is associated with a speaker identity.

14. The method of claim 13, wherein the beam search is configured to perform an operation including one or a combination of (1) generating a speaker transition probability and a linguistic token probability, (2) computing a score of a linguistic token, (3) expanding a list of prefixes of all speakers from a set of possible speakers, and (4) computing a score of a prefix by considering separately sub-sequences of different speakers.

15. The method of claim 12, wherein the encoder comprises a self-attention encoder and the decoder comprises an attention-based decoder.

16. The method of claim 12, wherein the neural network is trained to achieve multiple objectives by minimizing a loss function including a first component associated with an error in speech recognition and a second component associated with an error in speaker identification.

17. The method of claim 12, wherein the extended CTC objective function is an extended graph based temporal classification (GTC-e) objective function, wherein the GTC-e objective function uses supervisory information from a directed graph of nodes connected by edges representing labels and transitions among the labels, wherein the directed graph represents possible alignment paths for a sequence of probability distributions outputted by the neural network and the labels.

18. The method of claim 17, wherein the directed graph represents multiple possible alignment paths for the sequence of probability distributions and a sequence of the labels such that possible passes through a structure of the directed graph allows multiple unique label sequences, which are obtained after collapsing label repetitions and removing blank labels from the multiple unique label sequences, thereby resulting in a non-monotonic alignment between the sequence of the labels and the sequence of probability distributions.

19. The method of claim 18, wherein the non-monotonic alignment is encoded in the structure of the directed graph by allowing transitions from one label to multiple other non-blank labels, by allowing transitions from one label to multiple other blank labels, or both.

20. The method of claim 12, wherein the extended CTC objective function is a graph based temporal classification-transducer (GTC-T) objective function.

* * * * *